US012727010B2

(12) United States Patent
Elkotby et al.

(10) Patent No.: US 12,727,010 B2
(45) Date of Patent: Sep. 1, 2026

(54) SIDELINK CHANNEL RESERVATION ACQUISITION AND COLLISION RECOVERY IN WIRELESS COMMUNICATION SYSTEMS

(71) Applicant: InterDigital Patent Holdings, Inc., Wilmington, DE (US)

(72) Inventors: Hussain Elkotby, Conshohocken, PA (US); Ali Esswie, Montreal (CA); Ravikumar Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 267 days.

(21) Appl. No.: 18/556,271

(22) PCT Filed: May 6, 2022

(86) PCT No.: PCT/US2022/028137
§ 371 (c)(1),
(2) Date: Oct. 19, 2023

(87) PCT Pub. No.: WO2022/236097
PCT Pub. Date: Nov. 10, 2022

(65) Prior Publication Data

US 2024/0188107 A1 Jun. 6, 2024

Related U.S. Application Data

(60) Provisional application No. 63/273,476, filed on Oct. 29, 2021, provisional application No. 63/185,833, filed on May 7, 2021.

(51) Int. Cl.
*H04W 72/40* (2023.01)
*H04W 28/26* (2009.01)
(Continued)

(52) U.S. Cl.
CPC ........... *H04W 72/40* (2023.01); *H04W 28/26* (2013.01); *H04W 72/25* (2023.01); *H04W 72/563* (2023.01)

(58) Field of Classification Search
CPC ..... H04W 72/40; H04W 28/26; H04W 72/25; H04W 72/563; H04W 72/535
See application file for complete search history.

(56) References Cited

U.S. PATENT DOCUMENTS 7,403,539 B1 * 7/2008 Tang .................... H04W 24/00 370/445
2007/0097892 A1 * 5/2007 Tsang .................. H04L 47/724 370/310
(Continued)

FOREIGN PATENT DOCUMENTS

JP 2018160847 A 10/2018
WO WO 2014/187174 A1 11/2014
WO 2021030565 A1 2/2021

OTHER PUBLICATIONS

LG Electronics: "Discussion on resource allocation for Mode 2", 3GPP Draft; R1-1912588, vol. RAN WG1, No. Reno, USA; Nov. 18, 2019-Nov. 22, 2019 Nov. 9, 2019 (Nov. 9, 2019), XP051823495—16 pages. (Year: 2019).*
(Continued)

*Primary Examiner* — Ayaz R Sheikh
*Assistant Examiner* — Tarell A Hampton
(74) *Attorney, Agent, or Firm* — Flaster Greenberg P.C.

(57) ABSTRACT

The disclosure generally pertains to methods and apparatus for on-demand low-power sidelink channel reservation acquisition in wireless communication systems. A WTRU may determine to request on-demand reports related to sidelink resource usage. A WTRU that receives the report may generate a report based on its knowledge of sidelink resource usage. The responding WTRU may determine a
(Continued)

Extended access priority 1
Access priority 1
Access priority 2
Access priority 3
Example of a QRR channel resource over 3N slots
collision
collision
SL UEs of access priority 2 are idle
SL UEs of access priority 3 are idle
SL UEs updating QRR resource configurations
N slots
N/2 slots
N slots
N/2 slots priority associated with the report based on the relative amount of information it has regarding the sidelink resource usage. A response window for the response may be determined based on the priority. The responding WTRU then transmits the report in the corresponding response window. If a collision is detected for the report transmission, the response window may be extended and the report may be retransmitted in the extended response window.

17 Claims, 27 Drawing Sheets

(51) Int. Cl.
*H04W 72/25* (2023.01)
*H04W 72/563* (2023.01)

(56) References Cited

U.S. PATENT DOCUMENTS

| | | | | |
|---|---|---|---|---|
| 2010/0118698 | A1* | 5/2010 | Yokobori | H04W 74/085 370/328 |
| 2011/0074552 | A1* | 3/2011 | Norair | H04W 52/0216 340/10.1 |
| 2012/0220228 | A1* | 8/2012 | Tandai | H04W 76/10 455/41.1 |
| 2015/0045050 | A1 | 2/2015 | Sartori et al. | |
| 2020/0053711 | A1 | 2/2020 | Matsuda et al. | |
| 2020/0351705 | A1* | 11/2020 | Chae | H04L 5/0044 |
| 2021/0120555 | A1* | 4/2021 | Badic | H04W 72/12 |
| 2021/0168861 | A1* | 6/2021 | Lee | H04W 72/02 |
| 2021/0392545 | A1* | 12/2021 | Ryu | H04W 28/26 |
| 2022/0046746 | A1* | 2/2022 | Yang | H04W 72/0446 |
| 2022/0272626 | A1* | 8/2022 | Balasubramanian | H04W 24/08 |
| 2022/0329301 | A1* | 10/2022 | Shin | H04W 72/02 |
| 2023/0092224 | A1* | 3/2023 | Mohammad Soleymani | H04W 72/56 370/329 |
| 2023/0217368 | A1* | 7/2023 | Du | H04W 52/0235 370/311 |
| 2024/0031997 | A1* | 1/2024 | Lin | H04W 4/40 |

OTHER PUBLICATIONS

WO 2014/187174 A1, Cited in Search Report dated Nov. 7, 2022, in related International Patent Application No. PCT/US2022/028137, filed May 6, 2022.

3rd Generation Partnership Project, "Overall description of Radio Access Network (RAN) aspects for Vehicle-to-everything (V2X) based on LTE and NR" Technical Specification Group Radio Access Network, 3GPP TR 37.985, V16.0.0, Jun. 2020, 35 pages.

K. Ganesan, et al. "5G V2X Architecture and Radio Aspects," 2019 IEEE Conference on Standards for Communications and Networking (CSCN), Granada, Spain, 2019, pp. 1-6.

M. H. C. Garcia et al., "A Tutorial on 5G NR V2X Communications," in IEEE Communications Surveys & Tutorials, 55 pages.

S. Lien et al., "3GPP NR Sidelink Transmissions Toward 5G V2X," in IEEE Access, vol. 8, pp. 35368-35382, 2020.

R1-2102362, "Inter-UE coordination in sidelink resource allocation mode 2", R1-2102362 3GPP TSG RAN WG1#104b-e, Nokia, Nokia Shanghai Bell, Apr. 12-20, 2021, 15 pages.

R1-2102607, "Discussion on inter-UE coordination in Mode 2 enhancements", R1-2102607 Catt, Gohigh 3GPP TSG RAN WG1 meeting #104b-e, Apr. 12-20, 2021, 7 pages.

R1-2103417, "On Inter-UE Coordination for Mode 2 Enhancements", R1-2103417 3GPP TSG RAN WG1 Meeting #104b-e Convida Wireless, Apr. 12-20, 2021, 6 pages.

* cited by examiner

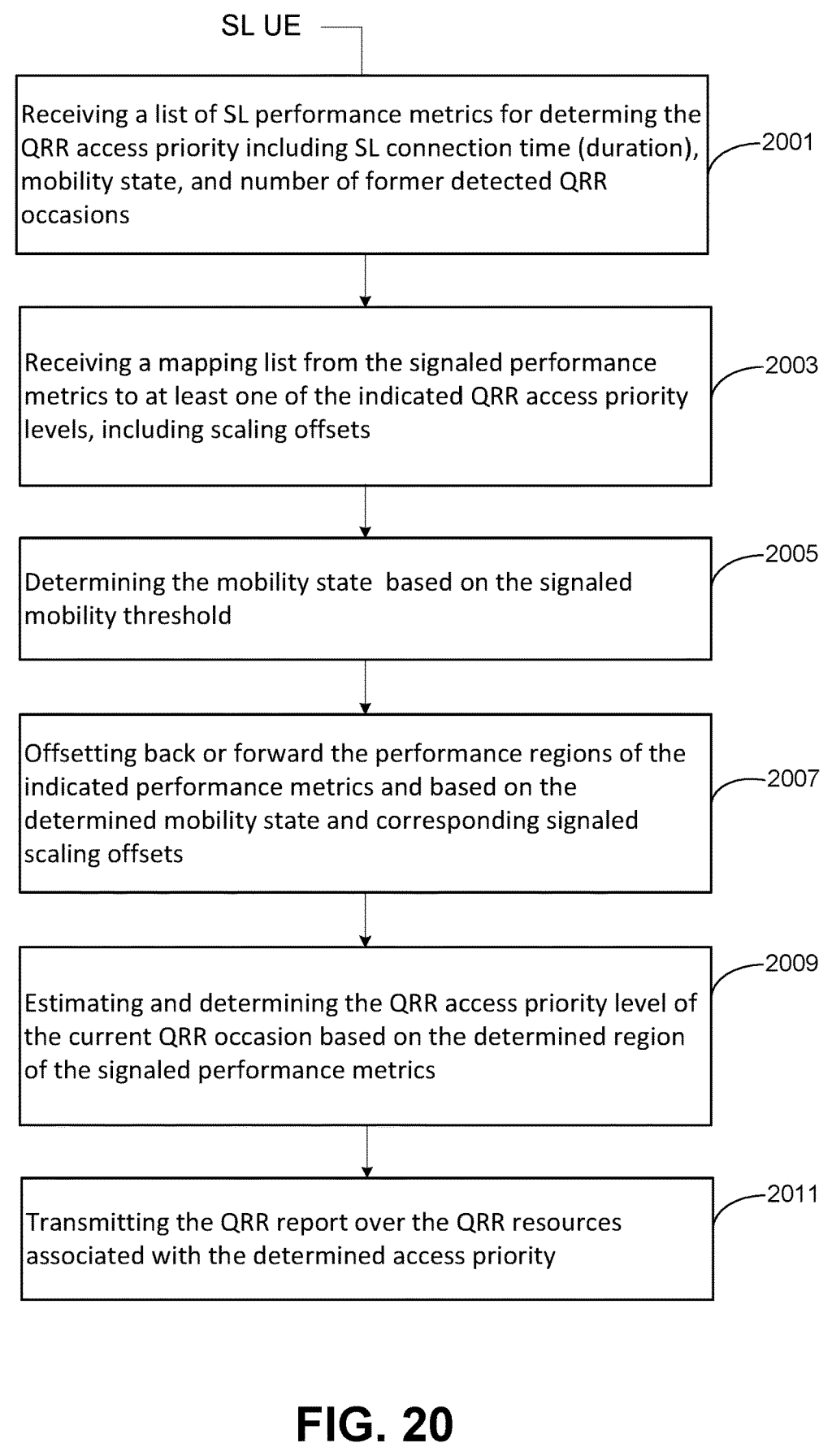

SL UE

Receiving a list of SL performance metrics for determining the QRR access priority including SL connection time (duration), mobility state, and number of former detected QRR occasions — 2001

Receiving a mapping list from the signaled performance metrics to at least one of the indicated QRR access priority levels, including scaling offsets — 2003

Determining the mobility state based on the signaled mobility threshold — 2005

Offsetting back or forward the performance regions of the indicated performance metrics and based on the determined mobility state and corresponding signaled scaling offsets — 2007

Estimating and determining the QRR access priority level of the current QRR occasion based on the determined region of the signaled performance metrics — 2009

Transmitting the QRR report over the QRR resources associated with the determined access priority — 2011

FIG. 20

| Communication scenario | | | | Payload (Bytes) | Tx rate (Message/ Sec) | Max end-to-end latency (ms) | Reliability (%) | Data rate (Mbps) | Communication range (meters) |
|---|---|---|---|---|---|---|---|---|---|
| Section # | Description | | CPR # | | | | | | |
| 5.1 | Among a group of UEs (or two UEs) supporting V2X application | | [CPR.P-004] | 50-1200 (NOTE 1) | 30 | 10 | | | |
| | | | [CPR.P-005] | 300-400 | 30 | 25 | 90 | | |
| 5.2 | Between UE supporting V2X application and RSU via another UE supporting V2X application | | [CPR.P-006] | [50-1200] | 2 | 500 | | | |
| 5.5 | Between UEs supporting V2X application | Driver control | [CPR.P-007] | 300-400 (NOTE 2) | | 25 | 90 | | |
| | | Fully automated driving | [CPR.P-008] | 1200 | | 10 | 99.99 | | 80 |
| 5.12, 5.13 | Between UEs supporting V2X application | Conditionally automated driving | [CPR.P-009] | [6500] | 50 | [20] | | | [10] sec * (max. relative speed) [m/s] |
| | | Highly/fully automated driving | [CPR.7. P-010] | | | [20] | | [65] | [5] sec * (max. relative speed) [m/s] |
| 5.12, 5.13 | Between UE supporting V2X application and RSU | Conditionally automated driving | [CPR.7. P-011] | [6000] | 50 | [20] | | | [10] sec * (max. relative speed) [m/s] |
| | | Highly /Fully automated driving | [CPR.7. P-012] | | | [20] | | [50] | [5] sec * (max. relative speed) [m/s] |

NOTE 1: This value does not include security related messages component.
NOTE 2: This value is applicable for both triggered and periodic transmission of data packets

FIG. 22

SIDELINK CHANNEL RESERVATION ACQUISITION AND COLLISION RECOVERY IN WIRELESS COMMUNICATION SYSTEMS

CROSS-REFERENCE TO RELATED APPLICATIONS

This application is the 371 National Stage of International Application No. PCT/US2022/028137, filed May 6, 2022, which claims priority to U.S. Provisional Application No. 63/185,833, filed on May 7, 2021, and U.S. Provisional Application No. 63/273,476, filed on Oct. 29, 2021, the entirety of which are incorporated herein by reference.

FIELD

This disclosure pertains to methods and apparatus for on-demand low-power sidelink channel reservation acquisition in wireless communication systems.

BACKGROUND

Mobile communications are in continuous evolution. For example, 5G network may be built on flexible radio access technologies. As these new technologies emerge, challenges arise in determining how to support a wide variety of usage cases with differing characteristics. As an example, wireless communication networks may allow for direct communications between one or more wireless transmit/receive units (WTRUs). Such direct communications may be referred to as sidelink (SL) communications. Although sidelink communications may allow for efficient and low latency communications between multiple WTRUs, issues can arise related to how to select and request sidelink resources for transmission and/or reception. This disclosure addresses methods and techniques that can be used to facilitate channel access for sideline communications.

SUMMARY

Methods and systems are disclosed for facilitating sidelink resource usage. For example, methods and systems disclosed herein may be used to provide WTRUs with information regarding sidelink resource usage of other WTRUs. The information regarding sidelink resource usage may be provided on-demand such that the requesting WTRU can obtain information regarding currently used sidelink resources without monitoring a large number of sidelink resources. As an example, upon determining that information regarding sidelink resource usage should be requested, the WTRU may send a request to one or more other WTRUs. The request may indicate that the WTRU is requesting information regarding current sidelink resource usage. The other WTRUs may receive the request. The other WTRUs may have been monitoring sidelink resource usage and may have obtained information regarding which sidelink resources are currently being used. The information about which resources are currently being used may have been determined based on measurements of the sidelink resources and/or may be determined based on previous sidelink usage reports/responses received by the other WTRUs.

The WTRUs that received the query may generate reports of sidelink resource usage based on their knowledge of which sidelink resources are currently being used. The WTRUs may determine a priority associated with the report. For example, if the WTRU has relatively substantial knowledge about the sidelink resource usage, the WTRU may determine that it should transmit a high priority report. For example, the WTRU may have been previously monitoring usage of the sidelink resources for an extended period of time and may have gathers a relatively large amount of information about sidelink resource usage. In an example, the WTRU may have received several recent reports about sidelink resource usage and may aggregate the information received in those reports. In this manner, WTRUs with relatively large amounts of information regarding sidelink resource usage may determine that their reports are of relatively high priority. WTRUs that have been monitoring sidelink resources for relatively less time and/or that have received relatively less reports may determine that their reports are of relatively low priority. As described further herein, various thresholds may be established to determine whether a report is of high, medium, low, etc. priority based on the amount of resource usage information gathered by a WTRU over a previous period of time.

A WTRU may then transmit a response to the query. The response may include information regarding resource usage known to the WTRU. The information may be an aggregation of information from various sources. Response windows may be established for the responses. The response windows may be associated with the determined priority. For example, a high priority response window may occur first in time. Relatively lower priority response windows may occur later in time. WTRUs may listen for responses. If the WTRUs determine that a collision occurred for two or more reports in a relatively high priority response window, the WTRUs may determine to extend the high priority response window.

In one or more embodiments of the present disclosure, a WTRUs includes a processor and a memory. In one or more cases, the processor is configured to receive a query requesting an indication of sidelink resources utilized by one or more other WTRUs. In one or more cases, the processor is configured to generate a response indicating one or more sidelink resources utilized by at least one of the WTRU and the one or more other WTRUs. In one or more cases, the processor is configured to determine a priority level of the response. In one or more cases, the processor is configured to transmit the response within a response window. For example, the high priority response window may be lengthened and a relatively low priority response window may be shortened and/or delayed. A WTRU associated with a high priority report that detects the collision may then re-transmit its high priority report in an extended portion of the high priority response window. A WTRU associated with a relatively low priority report that detects the collision may delay transmitting its low priority report until the occurrence of the delayed and/or shortened low priority response window.

In one or more embodiments of the present disclosure, a method implemented in a WTRU includes receiving a query requesting an indication of sidelink resources utilized by one or more other WTRUs. In one or more cases, the method includes generating a response indicating one or more sidelink resources utilized by at least one of the WTRU and the one or more other WTRUs. In one or more cases, the method includes determining a priority level of the response. In one or more cases, the method includes transmitting the response within a response window.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") Indicate Like Elements, and Wherein:

FIG. 20 is a diagram illustrating determining QRR access priority and corresponding WTRU sequence actions;

FIG. 22 is a table of example sidelink use cases from TR 22.886.

DETAILED DESCRIPTION

The disclosure herein is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the subject matter described. Moreover, although the disclosure provides a detailed example of possible implementations, it should be noted that the details are intended to be exemplary and in no way limit the scope of the application. For instance, possible implementations not specifically described herein may be practiced in lieu of, or in combination with, other implementations described, disclosed, or otherwise provided explicitly, implicitly and/or inherently (collectively "provided") herein.

Figure 1A:
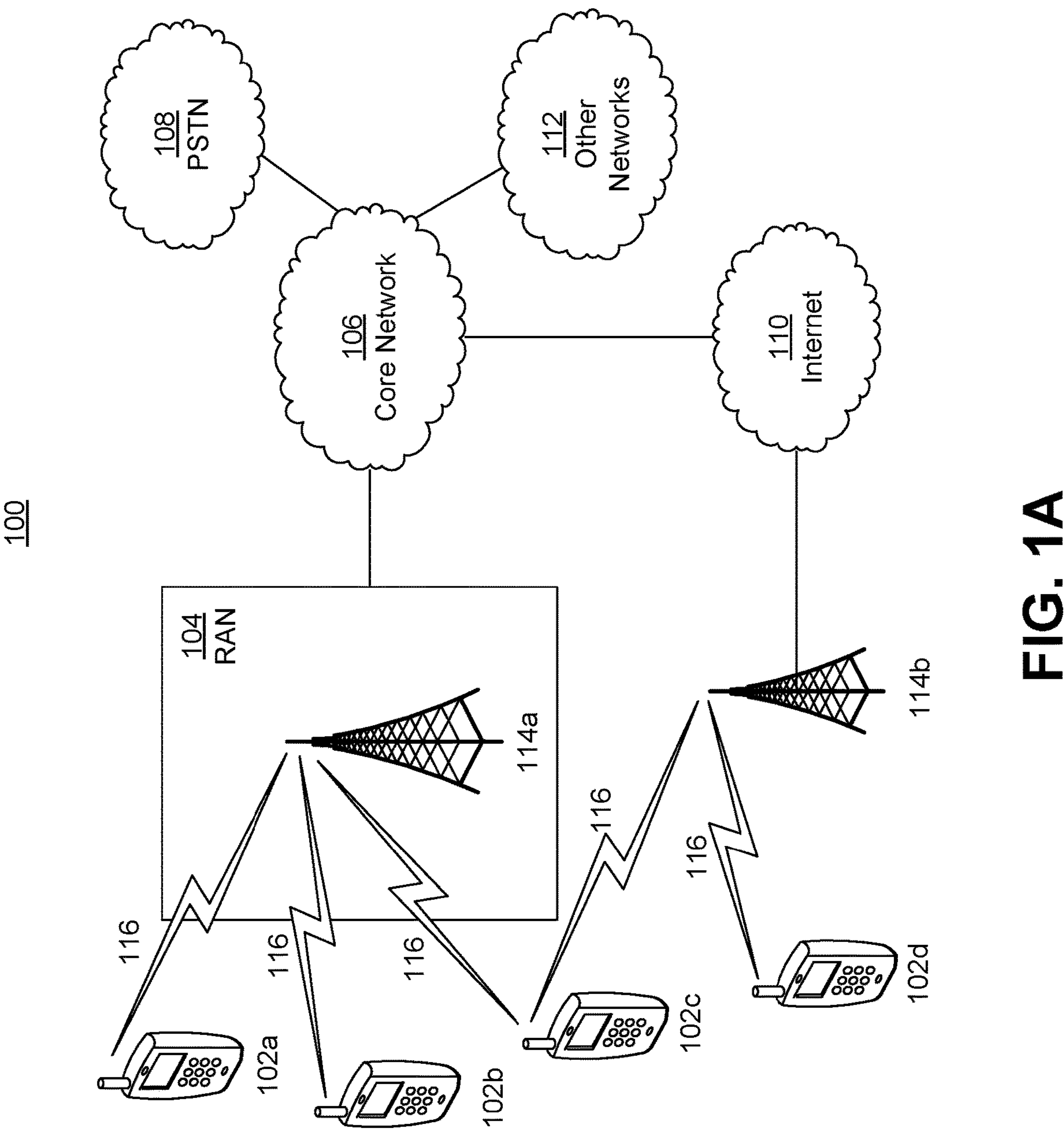
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
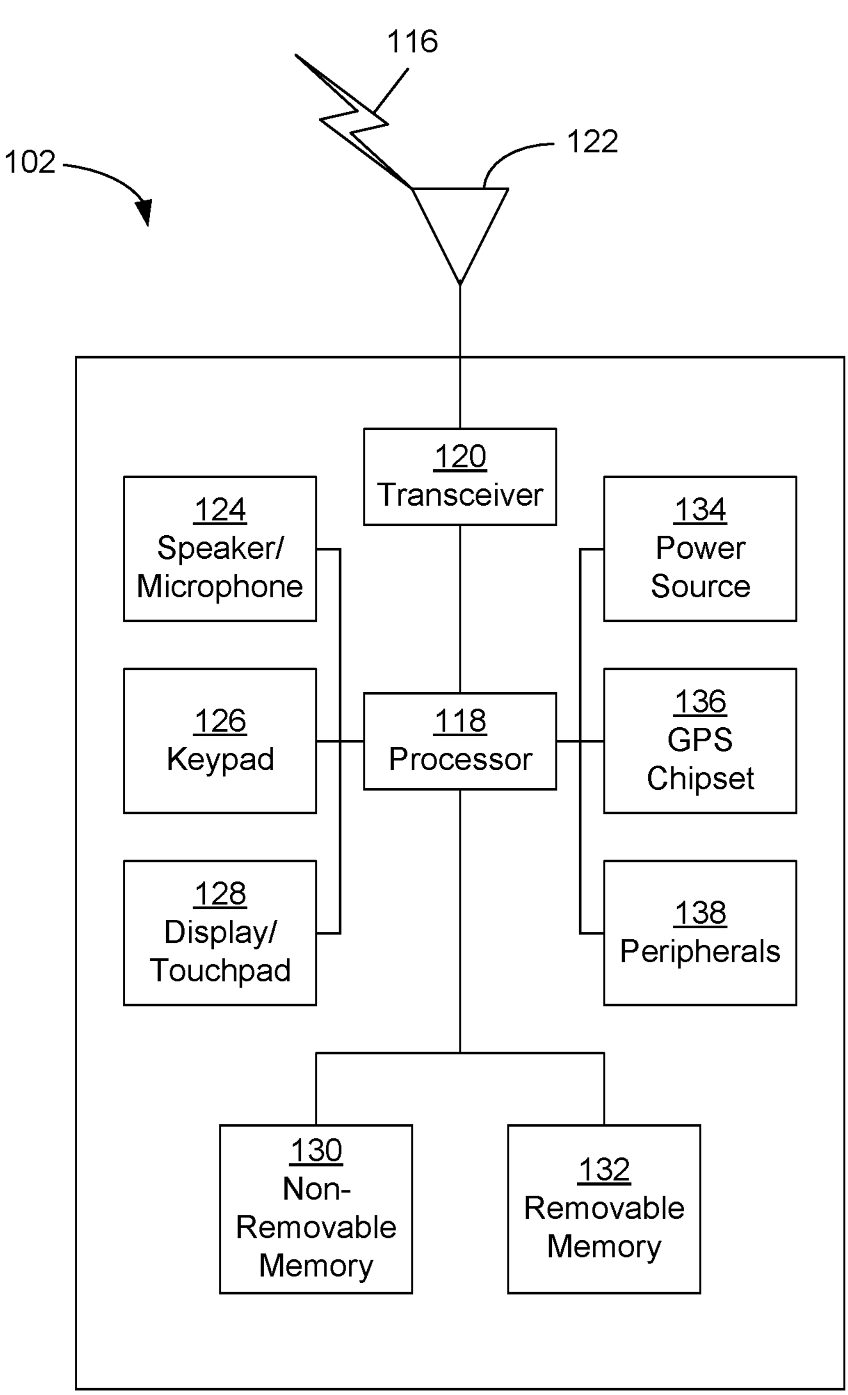
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
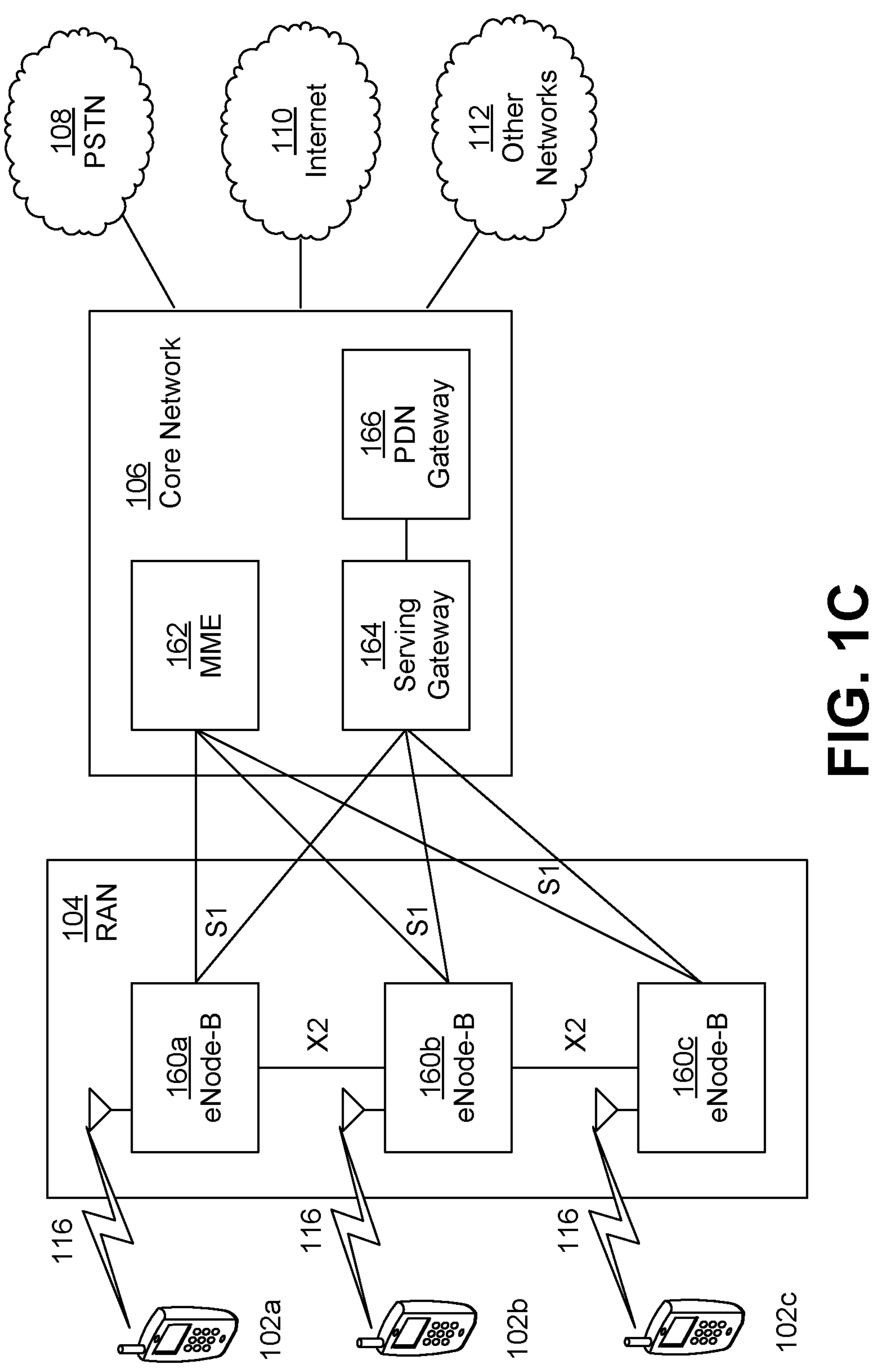
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
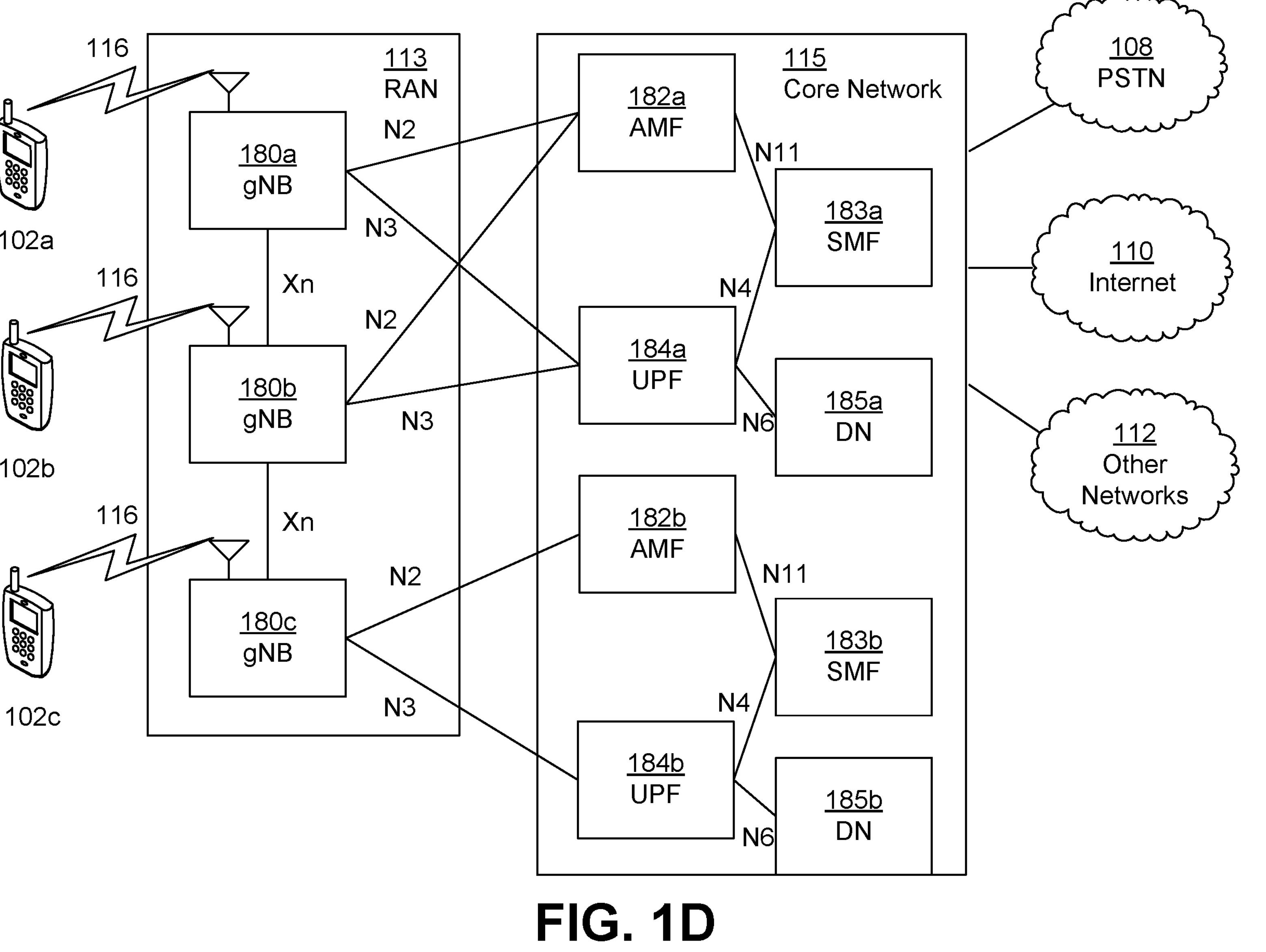
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the uplink (UL) and/or downlink (DL), support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182*a*, 182*b* may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

LTE is the first major cellular technology to support advanced sidelink communications. The main objective was to meet and support the basic vehicular to anything (V2X) use cases. LTE V2X is based on Single-Carrier Frequency-Division Multiple Access (SC-FDMA) and supports 10 MHz and 20 MHz channels. Moreover, LTE V2X communications only support broadcast transmissions, where the baseline assumption for sidelink (SL) traffic is that arrival of sidelink traffic is periodic. Particularly, the traffic can arrive at any time at the LTE UE, but the sidelink transmission will be transmitted on a fixed predefined periodicity. Therefore, LTE V2X WTRUs are assumed to be always ON/awake in order to sense and/or transmit or receive the periodic traffic. Thus, the power saving and energy efficiency of the V2X WTRUs have not been addressed.

For LTE SL communications, the physical resource blocks (PRBs) are grouped into several sub-channels. A sub-channel may contain several PRBs within the duration of a single subframe. However, the exact number of PRBs per sub-channel is configurable and may vary depending on the deployment scenario. The sub-channels are used to transmit and receive data and control information. The data payload transmissions are organized on the SL interface the same way as on the LTE interface. That is, the payload is organized in Transport Blocks (TBs), where a TB contains one or more packets. Thus, a TB may occupy one or several sub-channels depending on the size of the packet, the configured number of PRBs per sub-channel, and the used Modulation and Coding Scheme (MCS). Like regular data over the LTE radio interface, SL TBs may be transmitted using QPSK, 16-QAM or 64QAM.

On the control SL plane, each TB transmission has an associated Sidelink Control Information (SCI) message. That is, the SCI is analogous to the LTE downlink control information (DCI). The SCI includes information such as: an indication of the PRBs/sub-channels occupied by the associated TB transmission; the MCS used for the TB; the priority of the message that is being transmitted; an indication of whether it is a first transmission or a blind retransmission of the TB; and the resource reservation interval (RRI).

The LTE V2X use cases rely mainly on blind retransmissions to enhance the SL transmission reliability without receiver feedback, as all LTE V2X transmissions are in broadcast mode. Therefore, the transmission of a TB may be repeated in the time and/or frequency domains and combined at the receiver side. On the other hand, the RRI indication denotes the periodicity of the reserved resources, in case a sidelink UE requires periodic future transmissions. Thus, the RRI indicates to other sidelink WTRUs in proximity that the selected resource shall be reserved on this RRI periodicity until the resource allocation validity expires.

In 5G New Radio (NR) Sidelink Communications, the 5G SL communications inherit most of the LTE V2X overall functionalities, but with major system updates. Unlike LTE V2X, 5G NR SL supports unicast, groupcast, and multicast transmission over the PC5 SL interface. Furthermore, the 5G NR SL supports HARQ feedback over the SL PC5 interface to improve the SL communication reliability. In that regard, 5G SL introduces SL link quality of service establishment and tracking. Moreover, 5G NR supports a diversity of new V2X use cases, such as vehicle platooning, advanced driving, extended sensors, and remote driving. In that regard, 5G NR SL supports the LTE-like periodic SL traffic arrivals and transmissions as well as aperiodic traffic arrivals.

Transmissions in NR V2X SL use the orthogonal frequency division multiplexing (OFDM) waveform. The majority of 5G NR radio functionalities are available for 5G NR sidelink communications, such as the flexible numerology, slot-based transmissions, and bandwidth parts (BWPs). However, the mini-slot SL transmissions may not be supported due to the respective short coverage and lower WTRU transmission power. The smallest unit of time for scheduling SL transmissions in NR V2X is a slot and the smallest frequency unit is a sub-channel, thus sharing the same structure as of LTE V2X.

The concept of BWPs has also been adopted for NR V2X sidelink, where a SL BWP occupies a contiguous portion of bandwidth within a carrier and one SL BWP is configured for all WTRUs. Sidelink WTRU transmissions and receptions may be contained within the SL BWP and employ the same numerology. Thus, all physical channels, reference signals, and synchronization signals in NR V2X sidelink are transmitted within the SL BWP.

For a configured 5G NR BWP, all SL channels can be transmitted as follows. For instance, a physical sidelink control channel (PSCCH) carries the sidelink control information over the sidelink interface. For 5G NR SL, the SCI information is divided into two stages/parts. The first stage is the one transmitted over the PSCCH channel and contains a smaller set of the SL scheduling information. The first stage of the SCI information contains, for example, but not limited to, the timing and frequency resources of the reserved SL resources as well as the timing and frequency resources of the second stage SCI. The latter (i.e., the second stage SCI information) contains, for example, but not limited to, the transmission configurations of the scheduled SL transmission, such as MCS used, CSI request, HARQ process ID and configuration, etc. The second stage SCI is transmitted over the PSSCH channel.

In another instance, a physical sidelink shared channel (PSSCH) carries the actual SL data payload over the sidelink interface and additional control information (2nd stage SCI). In yet another instance, physical sidelink broadcast channel (PSBCH) carries information for supporting synchronization over the sidelink interface. PSBCH is sent within a sidelink synchronization signal block (S-SSB) from one or more active SL WTRUs. PSBCH may also contain the SL ID/RNTI of the SSB-transmitting WTRU, and whether the PSBCH is originally synchronized with the RAN interface or satellite, or the clock of the PSBCH. Furthermore, the PSBCH contains, for example, but not limited to, the direct frame number (DFN) of the SL interface, which is similar to the RAN system frame number (SFN). The latter information (i.e., the DFN of the SL interface) may be synchronized to the SLPC5 interface in case the SL WTRU that is receiving the SSB is out of coverage (OOC) of the RAN interface. Further, in another instance, a physical sidelink feedback channel (PSFCH) carries the HARQ feedback related to the successful or failed reception of a sidelink transmission. The PSFCH has a small bandwidth where the HARQ ACK/NACK from different receiving SL WTRUs can be multiplexed over the same timing and frequency resources using code division multiplexing.

In one or more cases, 5G RAN may configured SL slot structure in terms of, for example, but not limited to, the placement of the SL data symbols, SL control symbols, SL SSB transmission periodicity and timing, and PSBCH opportunities within a slot (e.g., in terms of a number and placement of the slot). In one or more cases, the PSCCH and PSSCH can be multiplexed and simultaneously transmitted. In one or more cases, the SL WTRUs may blindly search and decode the information sent over the PSCCH in order to identify the configuration of the corresponding PSSCH channel transmissions. In some cases, the transmissions of the SL SSBs may not be multiplexed with either the SL data or control channel. In such cases, no blind decoding may be required to detect the SL SSBs from the 5G NR SL WTRUs.

In NR V2X, one or more slots are configured to accommodate SL data or control transmissions. For example, the available sidelink resources may include slots allocated for sidelink (i.e., time resources) and common PRBs within a SL BWP (i.e., frequency resources). In one or more cases, a subset of the available SL resources is configured or preconfigured to be used by several WTRUs for their SL data/control transmissions. This subset of available SL resources may be referred to as a resource pool. In one or more cases, a resource pool is a set of contiguous subchannels over a certain number of symbols or slots. Additionally, the resource pool may be scheduled for SL WTRUs on a configured periodicity. A single SL subchannel implies an L number of contiguous SL PRBs within the SL bandwidth part. In one or more cases, the RAN node may configure the placement of the SL DMRS (i.e., De-Modulation Reference Signal). In such cases, the receiving SL WTRUs may tune their receivers by the SL channel estimate for data decoding.

In one or more cases, the SL SSBs are transmitted outside the configured data/control SL resource pools, but inside the configured SL BWP. In some cases, the RAN node may configure one of the SL WTRUs to always transmit SL SSB regardless of whether such SL WTRU is transmitting SL data or not. In another implementation, a SL WTRU that determines that there is poor coverage from the SL WTRU that is transmitting the SL SSB may self promote itself to transmit the SL SSB instead. SL SSBs from different WTRUs may not be prone to collisions as the location of frequency resources for SL SSB is dependent on the transmitting SL WTRU ID/RNTI, and hence, will be shifted in the frequency domain depending on the source SL WTRU ID.

Similar to LTE V2X, there are two SL resource allocation modes. For example, the first mode assumes that the SL WTRU is in coverage of the 5G RAN interface. Hence, when a SL WTRU does have an SL payload for transmission, the SL WTRU receives a SL scheduling grant from the serving RAN node. For the cases in which the SL WTRU receives the SL scheduling grant, the typical RAN dynamic grant or configured grant scheduling can be used. The former leads to increased end-to-end latency of the SL transmissions, while the latter may lead to resource under-utilization for configured grant type 1 or SL scheduling collisions for configured grant type 2.

In another example, in some cases, the second mode of the SL resource allocation may occur when SL WTRUs are OOC of the RAN interface. In some other cases, second mode of the SL resource allocation may occur when SL WTRUs are configured to use the second mode in order to reduce the control overhead of the RAN interface. In the second mode, SL WTRUs may autonomously transmit and receive over the SL PC5 interface without a connection to the RAN interface. In one or more cases, the configurations of the resource pools that SL WTRUs may select for SL transmissions or reception are preconfigured from the RAN node. Those pools may be shared across multiple SL WTRUs, and hence, SL WTRUs may autonomously sense the channel and select the freely available resources over which they can transmit their SL payload.

In the second SL resource allocation mode, a WTRU is configured to perform a three-step baseline procedure before the WTRU may transmit an SL payload. For example, a first step may include sensing the channel during the sensing window. In one or more cases, regardless of whether the WTRUs have a SL payload to transmit or not, the SL WTRUs sense and blindly decode all possible locations of the PSCCH during the configured symbols (i.e., by blindly searching and decoding the PSCCH search space). SL WTRUs identify the first stage SCI from other active SL WTRUs who are currently, and potentially in the future, transmitting SL payload. Thus, by sensing the channel, SL WTRUs identify the reserved current and future resources for other SL WTRUs, i.e., by detecting the RRI, the future channel reservation can be identified.

A second step may include, for example, down-selecting SL resources from the sensed resource pools. In one or more cases, there is a wide array of predefined rule on how SL WTRUs should perform this step. In some cases, one of the criteria that SL WTRUs use to down-select the sensed resources is to exclude the SL resources that are identified to be reserved for other transmitting WTRUs currently or in the future. Thus, the SL WTRUs end up with a list of free available resources that can be used to transmit their SL payload when SL packets arrive.

A third step may include, for example, re-evaluating and selecting resources. In one or more cases, resource re-evaluation may allow SL WTRUs to re-sense the channel shortly before the actual SL payload transmission. Resource re-evaluation may avoid resource collision with one or more aperiodic SL payload transmission from other SL WTRUs that are not detected by the full channel sensing in the first step. Once re-evaluation is finished, SL WTRUs may adjust their SL transmission configuration to ensure lower SL interface congestion and, accordingly, to randomly pick the proper amount of resources from the selected free available resources to transmit their SL payload.

As the SL interface is a distributed multi-access medium over shared resources, congestion may occur. In one or more cases, metrics, such as, but not limited to, channel busy ratio (CBR) and channel occupancy ratio (CR), are defined to control the SL interface congestion.

In some cases, CBR may be defined as the ratio of sub-channels that experience a RSSI higher than a preconfigured or configured threshold to the total number of sub-channels in the previous 100 subframes. In some cases, CR may quantify the channel occupancy generated by the transmitting vehicle. For example, CR is estimated in subframe n as the ratio between the number of sub-channels utilized by the transmitting vehicle in subframes [n−a, n−1] and selected by the vehicle for its remaining Reselection Counter transmissions in subframes [n, n+b] and the total number of sub-channels (i.e., where a and b are predefined integers that may be pre-signaled from the RAN.

When a SL WTRU is about to transmit a TB over the SL interface, it measures the CBR and maps it to one of the predefined and preconfigured ranges to get the maximum CR-Limit that it is allowed to use. Thus, the SL WTRU estimates its own CR and checks if it is higher than the CR-Limit. In such case, the SL WTRU either terminates its SL transmission or increases the utilized MCS in order to reduce the amount of the required SL resources for such SL transmission, hence, using a CR that is below the maximum allowed CR limit for the current conditions of the SL interface.

In one or more cases, objectives of the SL relaying may include extending network coverage of a remote WTRU by relaying via a WTRU-to-Network relay and power saving of a power-critical remote WTRUs by transmitting on a lower-pathloss WTRU-to-Network or WTRU-to-WTRU relay.

Two defined models for SL WTRUs to discover and connect to surrounding available SL relays may include, for example, but not limited to, Model A and Model B.

In one or more cases, Model A (i.e., “I am here”) may include an announcing WTRU and a monitoring WTRU. With respect to the announcing WTRU, the WTRU announces certain information that may be used by WTRUs in proximity that have permission to discover. With respect to the monitoring WTRU, the WTRU monitors certain information of interest in proximity of announcing WTRUs. In Model A, the announcing WTRU broadcasts discovery messages at pre-defined discovery intervals. The monitoring WTRUs that are interested in the discovery messages read these discovery messages and process the discovery messages.

In one or more cases, Model B (i.e., “who is there?”/“are you there?”) may include a discoverer WTRU and a discoveree WTRU. With respect to the discoverer WTRU, the WTRU transmits a request containing certain information about what the WTRU is interested in discovering. With respect to the discoveree WTRU, the WTRU that receives the request message (i.e., the discoveree WTRU) from the transmitting WTRU (i.e., the discoverer WTRU) can respond with information related to the discoverer’s request. In one or more cases, in model B, the discoverer WTRU sends information about other WTRUs that the discoverer WTRU would like to receive responses. For example, the information transmitted by the discoverer WTRU may include or correspond to a ProSe Application Identity corresponding to a group of WTRUs, and having received the transmitted information, the members of the group can respond.

When a Remote WTRU is connected to a Relay WTRU, the Remote WTRU may use SL-RSRP measurements on the sidelink unicast link to evaluate whether PC5 link quality with the Relay WTRU satisfies relay reselection criterion. For relay selection or relay reselection, the remote WTRU compares the PC5 radio measurements of a Relay WTRU with a threshold that may be configured or preconfigured by the gNB. In one or more cases, relay reselection is triggered if the NR Sidelink signal strength of the current Sidelink relay is below a configured threshold or pre-configured threshold. Also, relay reselection may be triggered if Radio Link Failure (RLF) of the PC5 link with the current Relay WTRU is detected by the Remote WTRU.

In one or more cases, LTE SL assumes that power saving WTRUs (e.g., pedestrian WTRU (i.e., P-WTRU)) perform sensing periodically and on a sub-sensing window. In some cases, the width of the sub-sensing window may be configured; however, the location of the sub-sensing window is set by each WTRU on its own. In such cases, a TX-only (i.e., P-WTRU) periodically communicates with an always active WTRUs. For 5G V2X with aperiodic traffic, additional short-term sensing may be considered for resource selection based on partial sensing. With respect to partial sensing, additional short sensing may help to evaluate whether the selected resource is reserved by other WTRUs specifically, for example, but not limited to, aperiodic services. For 5G V2X with periodic traffic, partial sensing supports re-evaluation at least on subsequent periods.

In one or more cases, DRX is proposed for power saving of SL P-WTRUs, which includes one or more of the same or similar operations to the 5G NR DRX. In such cases, the DRX ON/OFF durations (i.e., which is used for RX) are aligned to the partial (i.e., limited) sensing definition (i.e., which is used for TX candidate resource selection). For example, a WTRU may conduct the sensing and RX decoding during DRX active opportunities. As such, inter-WTRU coordination may utilize various options for communicating the DRX setup and the WTRU-specific partial sensing cycles. For example, WTRUs may extend their sub-sensing window and/or reception activity timers based on the actual conditions. In another example, the length of the sub-sensing window (i.e., a DRX ON duration) and the inactive sensing period (i.e., a DRX OFF duration) may be selected adaptively. For instance, if a WTRU is approaching a spot where the channel is more congested (with a high CBR value) and the SAs have high RSRP values, the WTRU may expand its sub-sensing/DRX ON duration for better reception of this critical condition.

It is noted that although the concepts described herein for improved energy efficiency in WTRUs is described with respect to cellular communications, it should be noted that these concepts also are applicable to WLAN (i.e., IEEE 802.11 Wi-Fi Systems) or other wireless systems.

As shown in the table illustrated in FIG. 22, which is reproduced from TR 22.886, there are several target communication scenarios defined for 5G SL. In one or more cases, the target communication scenarios may be characterized by different packet transmission rates and various target end-to-end latencies. Based on the current SL specifications, SL WTRUs at least perform SL channel periodic partial sensing in order to, for example, continuously identify the current and future channel reservations from other active SL WTRUs, which leads to significant power consumption. In one or more cases, the SL WTRUs may perform the channel periodic partial sensing regardless of whether the SL WTRUs are transmitting on the SL, and/or regardless of whether SLWTRUs have a fast packet transmission rate or not. In some cases, while a SL WTRU may decide to perform channel sensing less frequently and/or of lower duration to optimize the power consumption, such reduced frequency and/or duration may lower SL transmission reliability. For instance, SL WTRUs with SL packets for transmission over the SL interface may not sufficiently identify the free available SL resources that the SL WTRUs can use to transmit the SL packets without sufficient periodic partial channel sensing (i.e., involving a lot of PSCCH blind decoding), and hence, leading to lower reliability. This problem may be illustrated by the following example. For a low transmission-rate SL WTRU (e.g., one SL packet transmission per 500 ms), and to have sufficient SL reliability, the corresponding SL WTRU, performs partial channel sensing with a periodicity that is aligned with the lowest possible RRI interval that may be used by other active SL WTRUs. As such, the SL WTRU can detect the future channel reservations. Otherwise, SL reliability is lost. With 5G NR SL, the RRI may have values starting from one (1) ms. This means that an SL WTRU may perform partial sensing with PSCCH blind decoding every 1 ms period despite an average packet transmission rate of 1 packet per 500 ms. However, this results in significant power usage at the SL WTRU.

Disclosed herein are methods, apparatus, techniques, and procedures for on-demand sidelink channel reservation and acquisition for SL WTRUs that use minimal power.

In one or more cases, to maintain high SL transmission reliability, it is in the interest of both the already-transmitting SL WTRUs and the SL WTRUs that are about to start a new SL transmission to preserve a collision free environment. Partial channel sensing may allow the SL WTRUs to preserve a collision free environment. However, with partial sensing, some of the channel reservations of the latency/reliability-critical SL transmissions may be missed, and hence, the probability of a SL resource collision is increased. Thus, in one or more cases in which the latency/reliability-critical WTRUs with active transmissions duplicate/repeat their SL channel reservations on the PSCCH resources, a channel resource repetition procedure improves the probability of those channel reservations being detected at the other SL WTRUs having different channel sensing capabilities. In some cases, the channel resource repetitions may be in the form of the first stage SCI or a smaller version of the first stage SCI (e.g., by excluding the information on the second stage SCI), since those repetitions are not newly scheduled SL transmissions. In one or more cases, the repetition configuration may be signaled from the RAN node, the SL relay, or service provider.

In one or more other cases, with the SL paging procedure set forth in U.S. Provisional Patent Application No. 63/185,504 entitled Methods, Architectures, Apparatuses and Systems Directed to Low-Power Proximity-Based Service Paging for Multi-Carrier Sidelink Communications, filed on May 7, 2021, incorporated fully herein by reference, SL WTRUs may not perform partial channel sensing. Thus, in one or more cases, SL WTRUs may be configured to perform an on-demand means of partial sensing when potential idle SL WTRUs have new packet arrivals for transmission over the SL interface. In other cases, the partial sensing requirement may not be utilized for SL WTRUs without loss of SL reliability. In such cases, two new periodic or non-periodic occasions/channels are defined over the SL interface and reserved for the purpose of transmitting a SL channel reservation query and channel reservation response. Those signals are considered to be on-demand wake-up periods for SL idle WTRUs, where an SL idle WTRU wakes up when the SL idle WTRU has a SL packet arrival for immediate SL transmission. For active TX SL WTRUs, the new periodic or non-periodic channels are considered to be transmission gaps. That is, the new periodic or non-periodic channels may not transmit on the SL interface where the channels are expected to receive a potential query for a channel reservation. In some cases, such restriction may be applicable to half-duplex WTRUs. In other cases, full duplex Tx SL WTRUs may transmit on the SL interface while receiving and processing the potential channel reservation queries. Upon receiving such a query, TX WTRUs or SL WTRUs with active channel reservations respond back with their booked channel reservations in a broadcast fashion and over the configured resources for the channel reservation query response. In this way, using the on-demand channel reservation query, IDLE SL WTRUs may select a free set of resources for immediate SL packet transmissions, without performing the power-consuming partial sensing and the associated blind decoding.

In one or more other cases, and similar to the above discussed cases which may or may not utilize partial sensing, a power-limited SL WTRU may be configured in deep sleep (e.g., for most of the time, while not performing continuous or partial channel sensing). The power-limited SL WTRU remains, for example, in deep sleep until the SL WTRU has an arriving payload for transmission over the sidelink interface. In such cases, the SL WTRU requests other SL WTRUs in proximity to indicate their active channel reservations. In one or more cases, the source WTRU may select and/or be configured to select the idle SL resources for transmission. Further, one or more SL WTRUs, which have formerly performed channel sensing and/or have previously received several channel reservation reports, may compile the aggregate active channel reservation, for example, from each SL WTRU's perspective. In one or more cases, the SL WTRUs may signal the aggregate active channel reservation back to the requesting SL WTRU. That is, for example, during the proposed feedback channel, the SL WTRUs may perform channel access to signal their active reservations to the requesting SL WTRU. In some cases, such signaling may entail a considerably large overhead, for example, but not limited to, when a plurality of surrounding SL WTRUs are associated with active SL transmissions. In such cases, one or more SL WTRUs report back overlapping aggregate channel reservations (e.g., partially similar active channel reservations). For example, one or more SL WTRUs may report back overlapping aggregate channel reservations in a case where those WTRUs may have performed concurrent channel sensing. That is, in cases where repeating the transmission of the overlapping channel reservation reports unnecessarily, there may be increases in feedback latency, and accordingly, the transmitting WTRUs consume more power. In one or more cases, for example, but not limited to those which include a repeated transmission of the overlapping channel reservation reports, SL WTRUs may receive and decode the channel reservation reports from other SL WTRUs in proximity to the receiving SL WTRUs. Further, in some cases, the SL WTRUs may only transmit an incremental channel reservation report of the reserved channel resources that have not been previously reported by other SL WTRUs. In yet other cases, the SL WTRUs may transmit the incremental channel reservation report along with additional information. Accordingly, by utilizing an incremental channel reservation report, the size and transmission time of the channel reservation feedback report may be minimized.

In one or more other cases, and similar to the above discussed cases which may or may not utilize partial sensing, in response to (i.e., on condition of) receiving a CRQ request from at least one SL WTRU, one or more SL WTRUs, in proximity to the at least one requesting SL WTRU, may report back their QRR reports to the requesting WTRU over the configured QRR resource sets. In such cases, a QRR channel access scheme may be used to resolve any potential QRR collisions. SL WTRUs, for example, based on their determined SL performance metrics (e.g., but not limited to, connection time, number of former QRRs, mobility state, etc.), may determine their QRR access priority and/or contention window. In one or more cases, SL WTRUs of the highest configured access priority and which their QRR reports are most credible and inclusive, may transmit the respective QRR reports on the QRR resource sets associated with this QRR access priority. In such cases, one, more than one, or all SL WTRUs from same or other access priorities may monitor and may decode QRR reports received from the other SL WTRUs. On condition that a collision is detected, SL WTRUs having higher access priority may dynamically extend the validity of their QRR resources, for example, by a pre-configured timing or frequency offset, for example, to allow them to re-transmit the collided QRR reports. In such cases, the SL WTRUs having lower access priorities may reduce and/or shorten their QRR resources by the timing and/or frequency offsets. Additionally or alternatively to reducing and/or shortening QRR resources, the SL WTRUs having lower access priorities may (e.g., completely) skip transmitting their QRR reports during the current QRR occasions. For example, the SL WTRUs having lower access priorities may skip transmitting their QRR reports based on the fixed resources size of the QRR occasion. In one or more cases, an adjusted response window may indicate that a transmission of a response is not required. That is, the SL WRTU may determine that a response window was adjusted and may determine that a transmission of a response is not required.

In one or more cases, and similar to the above discussed cases which may or may not utilize partial sensing, SL WTRUs may determine the QRR access priority prior to each of the QRR occasions. In such cases, SL WTRUs may consider a predefined set of SL performance metrics (e.g., but not limited to, a mobility state, SL connection time, number of formerly detected QRR reports, etc.). SL WTRUs may determine the corresponding SL mobility state, for example, based on the pre-configured mobility thresholds. Based on the determined SL mobility state, a SL WTRU may dynamically map the determined SL mobility state to one or more SL performance regions. In some cases, the SL WTRUs may dynamically map the determined SL mobility state based on, for example, but not limited to, determined scaling factors. In one or more cases, each performance region may be associated with a pre-configured QRR access priority and contention window. For example, a high mobility state of a SL WTRU may be determined based on the preconfigured mobility threshold. The SL WTRU may determine the corresponding scaling factor of the adopted performance metric for channel access (e.g., a SL connection time prior to the QRR occasion). The SL WTRU may map the mobility state to a certain SL performance region, for example, as being sufficient or not sufficient. In one or more cases, the SL WTRU may determine its own QRR access priority.

In one or more cases, and similar to the above discussed cases which may or may not utilize partial sensing, one or more SL WTRUs may have various channel sensing settings. In one or more cases, the one or more SL WTRUs may have various channel sensing settings based on, for example, but not limited to, mobility and different power capabilities. For the cases in which SL WTRUs have various channel sensing settings, other SL WTRUs in proximity and which have not performed concurrent channel sensing may not detect one or more channel reservation announcements and/or assignments. In such cases, SL WTRUs may be configured to maintain a reliable SL transmission while supporting power efficiency for power-limited SL UEs. In one or more cases, WTRUs may perform a dynamic channel reservation repetitions procedure, in which power non-limited SL WTRUs may repeat the transmission of their channel allocations in common occasions. A WTRU may be configured to determine the common occasions based on the DRX cycle of the power-limited SL WTRUs. For example, a WTRU determines the common occasions based on the DRX cycle of the power-limited SL WTRUs, which may wake up for opportunistic channel sensing. In such cases, SL service providers may compile common occasions for power limited SL WTRUs to perform channel sensing. Further, the power-non-limited SL WTRUs may repeat their channel allocation information, for example, on condition that the validity of those allocations is not expired.

Figure 2:
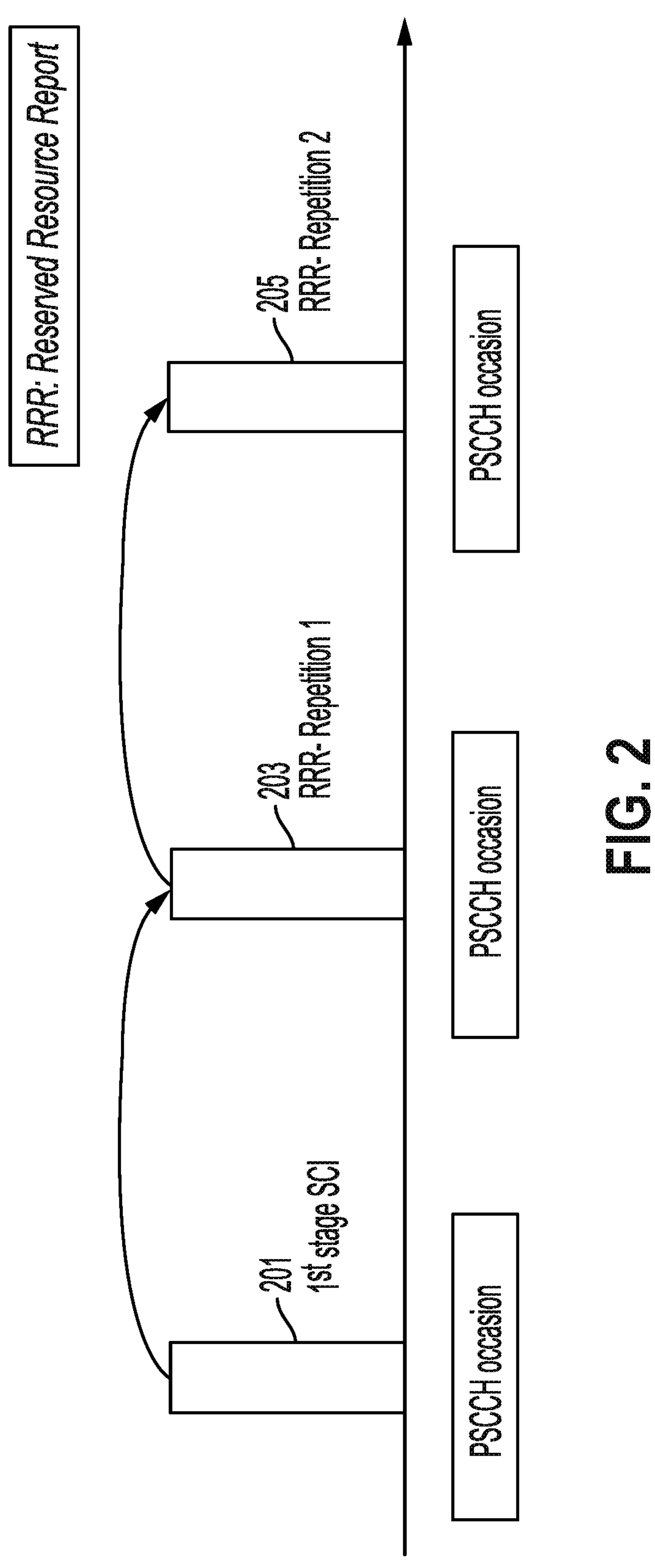
FIG. 2 is a timing diagram illustrating transmissions of SCI on a PSSCH.
Figure 3:
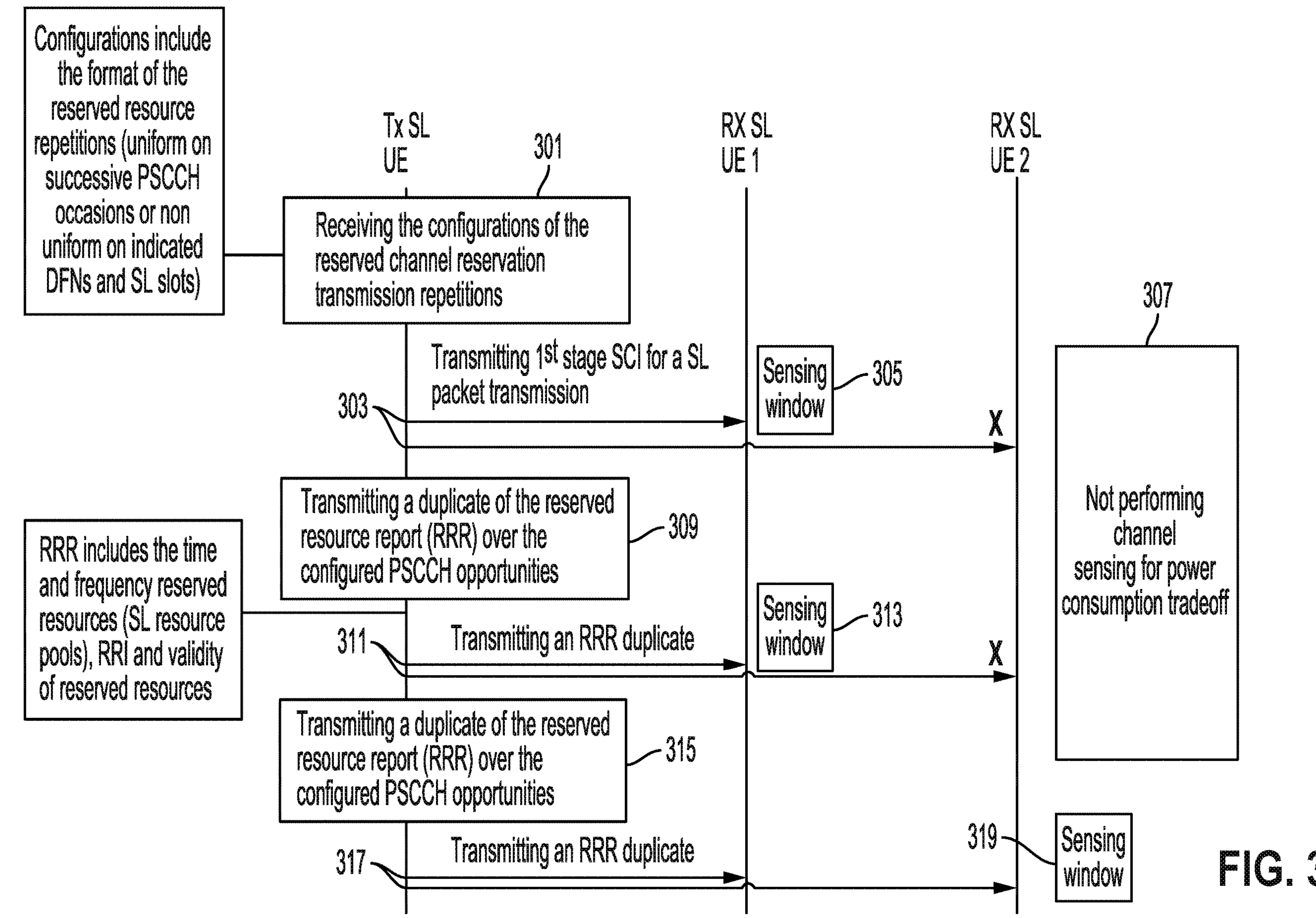
FIG. 3 is a flowchart illustrating transmissions of SCI.

In one or more cases, a WTRU may be configured to repeat one or more channel reservations to improve SL reliability. For instance, a SL WTRU, upon being configured by the serving RAN node, repeats or duplicates its active SL channel reservations on one or more PSCCH resources. For example, referring to FIG. 2, which is a timing diagram of a PSCCH, a reliability-critical SL WTRU transmits the first stage SCI for its intended SL receiver. The reliability-critical SL WTRU may transmit the first stage SCI to identify the SL resources selected for such transmission, as well as, one or more of the SL transmission configurations. Having transmitted the first stage SCI, the SL WTRU duplicates the transmission of the active channel reservations over one or more upcoming PSCCH opportunities (e.g., occasions 201, 203, 205). The duplicated channel reservation indication may include the SL time and frequency reserved resources (i.e., resource pools), associated RRI, and the validity duration of those reserved resources. That is, the duplicated channel reservation indication may include a short version of the initial first stage SCI. In another case, the SL WTRU may repeat the transmission of the full first stage SCI over one or more configured PSCCH occasions. As such, by repeating one or more channel reservations as described herein, SL WTRUs, which adopt different settings of the partial sensing (e.g., but not limited to, various sensing instants and sensing durations to meet the various requirements of the power consumption) may better detect those channel reservations. Further, by better detecting the channel reservations, the SL WTRUs may avoid the selection of the associated resources, thereby enhancing SL reliability. FIG. 3 illustrates the example transmissions of SCI to improve SL reliability.

In one or more cases, configurations of reserved channel reservation transmission repetitions are received by the Tx SL WTRU (301). For example, the Tx SL WTRU receives from a RAN node configurations of the repetitions of the SL channel resource reservations over the SL interface. In one or more cases, the configurations may include the format of the reserved resource indication/report. The reserved resource indication/report may include, for example, but not limited to, the number of SL repetitions over the PSCCH channel. In some cases, the configurations may be received as successive repetitions on subsequent PSCCH occasions. In other cases, the configurations may be received as non-uniform repetitions with the indication of the SL direct frame number (DFN) and slots over which the reserved resource report repetition should be transmitted. Additionally or alternatively to the reserved resource indication/report may including a number of SL repetitions over the PSCCH channel, the reserved resource indication/report may include the reserved time and frequency SL resources (i.e., resource pools), associated RRI, and validity of the reserved SL resources.

In one or more cases, the Tx SL WTRU, with active SL transmissions, transmits its reserved channel resources repeatedly. For example, the Tx SL WTRU may transmit (303) a 1$^{st}$ stage SCI for a SL packet transmission. In other instances, the Tx SL WTRU may transmit (311 and 317) RRR duplicates. In one or more cases, the Tx SL WTRU transmits its reserved channel resources repeatedly in the form of a reserved channel resource indication/report over the configured number of the PSCCH opportunities. As illustrated in FIG. 3, the first Rx SL WTRU (UE 1) has a sensing window 305 that is configured to overlap with the first and second RRR transmissions 303 and 311 of the Tx SL WTRU, and thus receives the RRR twice. In this example, FIG. 3 illustrates that the other Rx SL WTRU (UE 2) does not have a sensing window that coincides with the first two RRR transmission occasions, 303 and 311. However, FIG. 3 illustrates that Rx SL WTRU (UE 2) has a sensing window 319 that overlaps with the third occasion 317. Thus, Rx SL WTRU (UE2) receives the RRR on the third occasion 317.

In one or more cases, a WTRU is configured to enable sidelink on-demand query of channel reservations and occupancy for each SL carrier. In one or more cases, SL idle WTRUs (e.g., based on proposed SL idle mode in aforementioned U.S. Provisional Patent Application No. 63/185,504) may be configured and remain in deep sleep except when SL paged, for unicast reception, multicast reception, broadcast reception, or for the cases in which there is at least a single SL packet arrival for immediate transmission over the SL interface. During deep sleep, the SL WTRUs may not perform the periodic partial sensing, thereby achieving decent power savings. However, by not performing periodic partial sensing, the SL WTRUs may not identify SL channel reservations of other active SL transmitters. Hence, when blindly transmitting an SL packet on a randomly selected resource set, the probability of a collision increases. Moreover, the overall SL link reliability may be severely degraded. Furthermore, for congestion control of the SL interface, SL WTRUs may always estimate the channel busy ratio (CBR) in order to identify how busy the SL interface is, and accordingly, act and dynamically adjust their current channel occupancy ratio (CR) to avoid congesting the SL interface. As idle SL WTRUs do not perform periodic partial sensing for the sake of power saving gains, the CBR metric is not reliably calculated due to the very small number of estimates. Hence, the SL congestion may not be well controlled.

Figure 4:
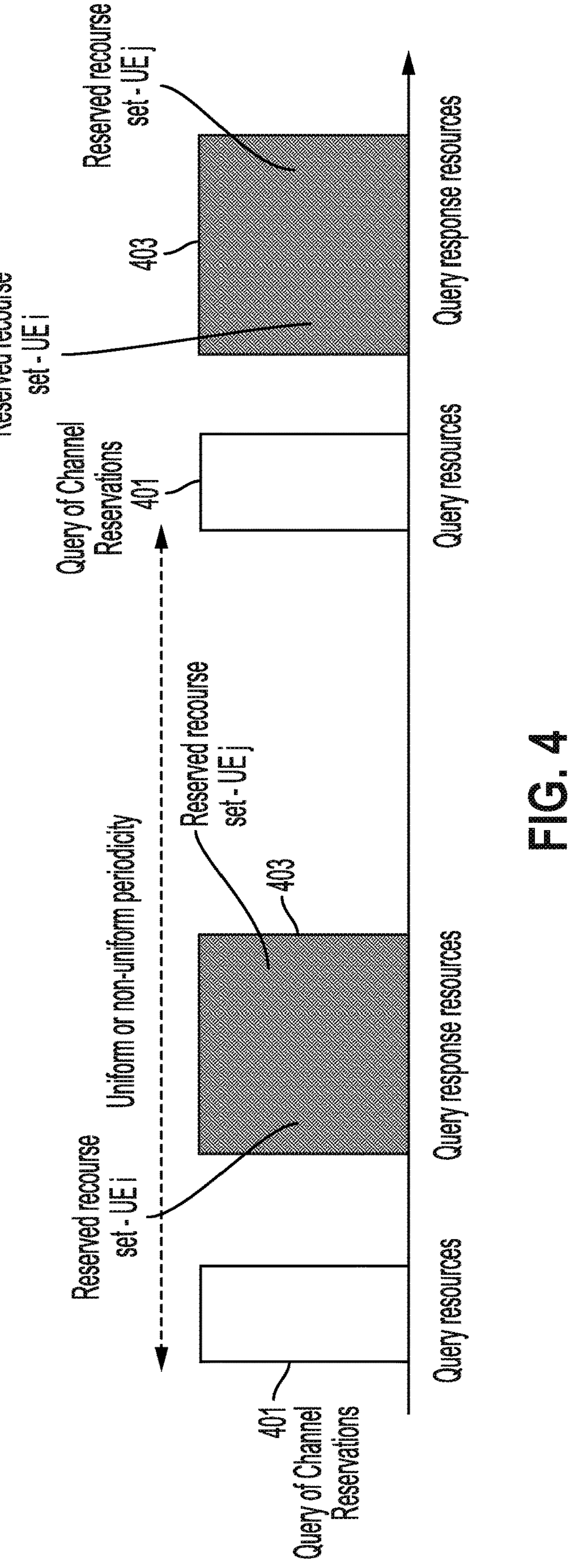
FIG. 4 illustrates a timeline of messaging at a RAN node that is configuring a SL WTRU.

To avoid these problems, the disclosure provides herein (e.g., as illustrated in FIG. 4) a procedure for on-demand channel reservation query. In this procedure, idle SL WTRUs may utilize an on-demand scheme to request reachable SL WTRUs in order to transmit their active reservations to the idle SL WTRUs. In one or more cases, the on-demand scheme may be utilized when there is a packet arrival for immediate transmission over the SL interface. In one or more cases, responding SL WTRUs have ongoing transmissions over the SL interface and/or include future reserved SL resources for future SL transmissions, such as, but not limited to, potential SL packet repetitions. As such, idle SL WTRUs may identify the available resources to use for immediate SL packet transmissions without a loss of SL reliability (i.e., a collision-free SL transmission).

FIG. 4 illustrates an example baseline on-demand SL channel reservation acquisition, and in particular an example timeline of messaging at the RAN node that is configuring a SL WTRU. As illustrated in FIG. 4, the RAN node configures and signals the SL resources for transmitting the channel reservation query (CRQ) and the corresponding query resource response (QRR) (e.g., messages 401). In one or more cases, the CRQ is a request indicating that the reachable WTRUs having active/current and/or future channel reservations transmit their respective channel bookings back to the RAN node. In one or more cases, the corresponding QRR (e.g., messages 403) is a report that includes one or more of the reserved resource pools, resource reservation interval (RRI), and validity of those resource reservation. In one or more cases, after receiving the report, other SL WTRUs may assume that those resources are now available. Moreover, the other SL WTRUs may assume that those resources are released from the transmission of the signaling WTRU. In one or more cases, the SL WTRUs may be configured with a resource allocation pattern to transmit a query response that includes one or more response windows. In some cases, each response window may be associated with one or more time and frequency resources. In one or more cases, the RAN nodes configure periodicity and time/frequency resources. The RAN nodes may transmit the periodicity and time/frequency resources over the RAN interface. In some cases, SL relays may relay (e.g., over the PC5 interface) the periodicity and time/frequency resources to a remote WTRU, which may be located outside of the RAN coverage.

In one or more cases, the CRQ and QRR resources can employ one or more of the same or similar access modes as the SL paging in the aforementioned U.S. Provisional Patent Application No. 63/185,504. That is, a CDM-based or sensing-based CRQ and QRR transmission allows multiple SL idle WTRUs to simultaneously transmit the CRQ and/or multiple Tx SL WTRUs to concurrently provide feedback to the respective QRR. When providing resources of the CRQ, the active SL Tx WTRUs may consider them as SL transmission gaps in order to receive the CRQ indications from potential idle SL WTRUs. In one or more cases, the active SL Tx WTRUs may consider the transmission gaps for half duplex SL WTRUs, as half duplex SL WTRUs cannot transmit over the SL interface at the same time the half duplex SL WTRUs are expected to receive potential CRQs. In one or more other cases, the active SL Tx WTRUs may not consider the transmission gaps for full duplex SL WTRUs, as the SL full duplex WTRUs are able to RX and TX at the same time.

Figure 5:
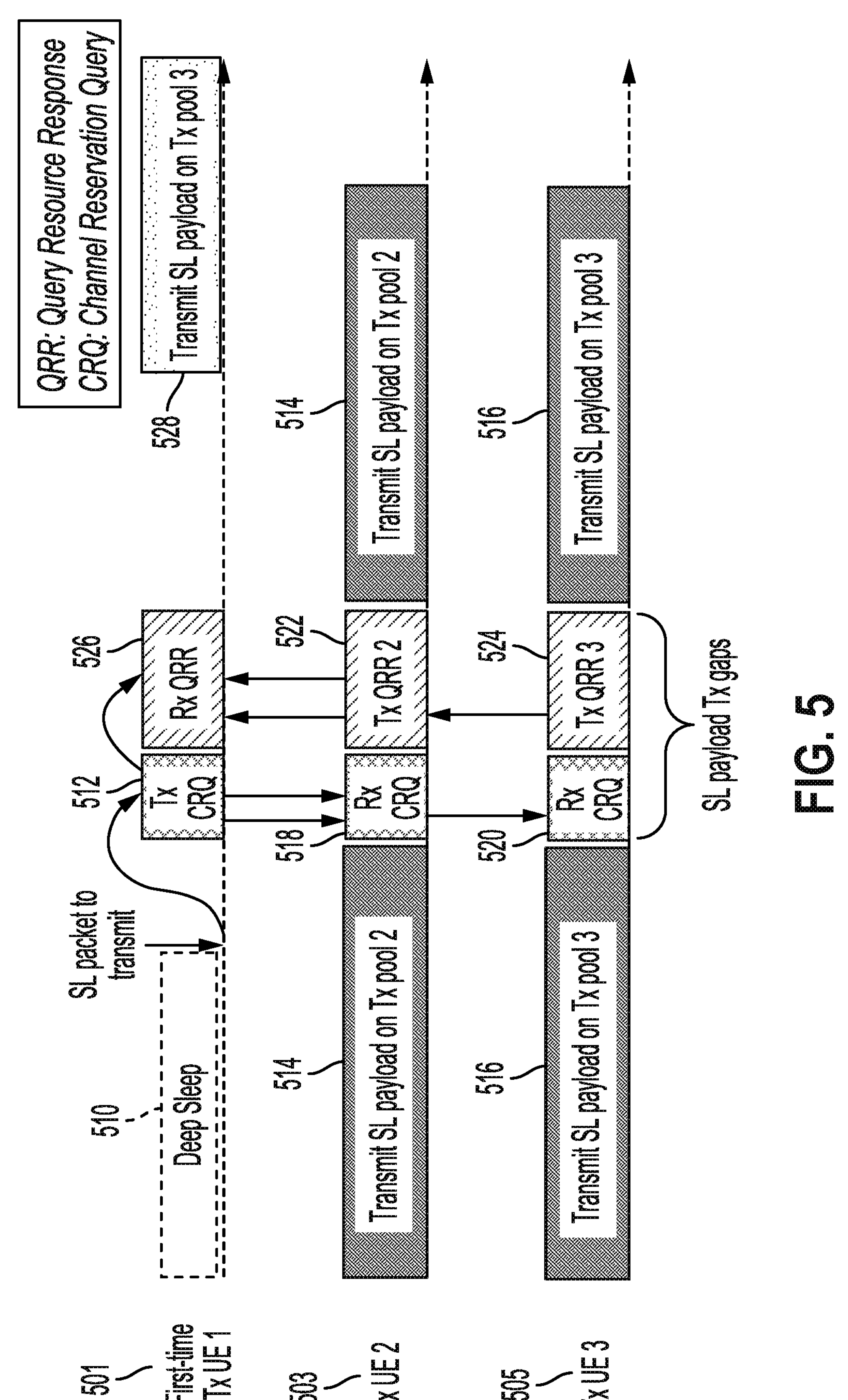
FIG. 5 is a timing diagram illustrating signaling for CRQ discovery.

In an example, as depicted in FIG. 5, an idle SL WTRU 501 has a SL packet arrival (not shown), while the idle SL WTRU 501 is in deep sleep 510 (i.e., SL IDLE state). In one or more cases, the idle SL WTRU 501 wakes up and picks a sufficient amount of SL resources. Having picked the SL resources, the SL WTRU 501 transmits the SL packet. In one or more cases, the SL WTRU 501 transmits the CRQ indication 512 over the next available CRQ resource occasion, configured from the RAN node. For the reachable SL WTRUs, with active SL transmissions, those CRQ occasions are considered transmission gaps. For instance, SL WTRUs 503, 505 (i.e., Tx UE 2 and Tx UE 3) both halt their SL transmissions 514, 516 during the CRQ transmission, in case half-duplex SL WTRUs are assumed. In one or more cases, SL WTRUs 503, 505 receive the corresponding CRQ request (e.g., as shown at 518, 520) and respond with QRR reports 522, 524, respectively. In one or more cases, in addition to or in the alternative to responding with QRR reports 522, 524, SL WTRUs 503, 505 respond with the reserved resource pools, associated RRI (if applicable), validity of resource reservation, and the estimated channel CBR ratio. The Tx SL WTRUs 503, 505 can return to their SL transmissions 514, 516 after sending their QRR reports 522, 524. In one or more cases, by providing the indication of the CBR within the QRR reporting, the number of CBR samples may be increased, thereby providing SL congestion control. In such cases, the idle SL WTRU may analyze the increased number of CBR samples before transmitting its SL packet, thereby allowing the idle SL WTRU to tune its own SL transmission parameters based on the perceived CBRs and avoid contributing to the SL interface congestion. In one or more cases, the idle SL WTRU 501 receives the various QRR reports (as shown at 526), and determines that Tx pool 3 is available for transmission starting from the indicated SL slot. As such, the idle SL WTRU 501 occupies Tx pool 3 for its own packet transmission, as shown at 528. In one or more cases, the transmission of the CRQ and QRR channels follow the same procedure as the SL paging occasion (i.e., CDM or sensing based).

In one or more other cases, a SL WTRU may blindly decode the first stage SCIs from other SL WTRUs. The SL WTRU may compile an accumulated SCI that reflects the SL channel reservations of the SL WTRU as well as the detected channel bookings from other active SL WTRUs. For the cases in which the CRQ occasion is due, and there is a CRQ request indication from at least a single idle SL WTRU, the active WTRU transmits the accumulated SCI during the corresponding QRR occasion. In one or more cases, if sensing-based access is adopted, other active SL WTRUs may sense and detect the QRR resources until those SL WTRUs are free to transmit their QRR reports as well. For the cases in which the other active SL WTRUs have detected an accumulated SCI with up to date channel reservations of their own channel reservations, these WTRUs may skip transmitting the QRR reports on a dedicated set of the QRR resources. That is, these WTRUs may skip transmitting the QRR reports as their channel reservation information is already updated at the source SL WTRU.

Figure 6:
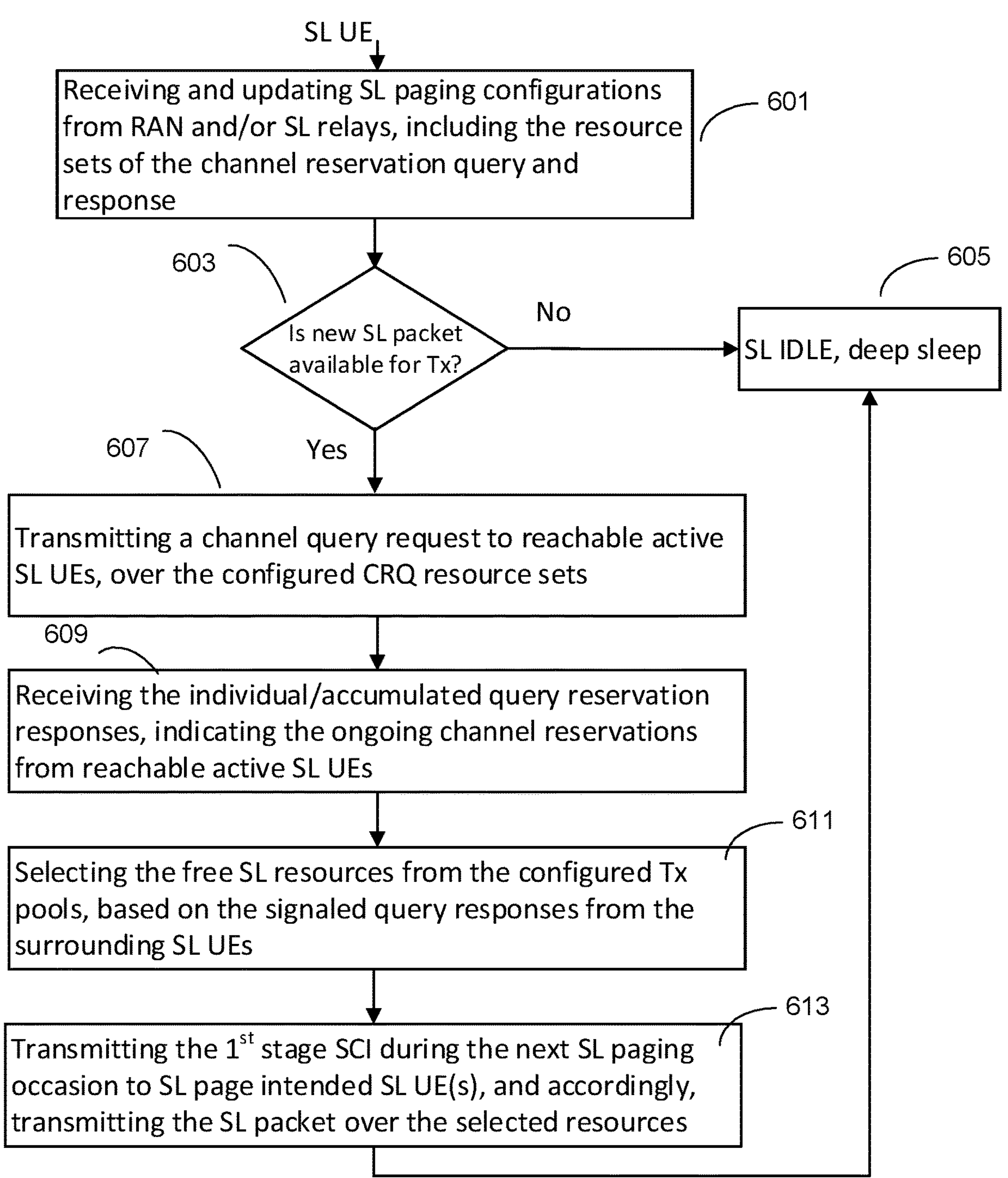
FIG. 6 is a flowchart summarizing a procedure for sidelink on-demand query of channel reservations and occupancy.

FIG. 6 illustrates a flowchart summarizing the procedure for sidelink on-demand queries of channel reservations and occupancy.

In one or more cases, SL paging configurations may be received from RAN and/or SL relays and may be updated (601). For example, the SL WTRU (i.e., the SL UE) receives from the RAN node configurations of the on-demand query of the SL channel reservations (e.g., SL paging configurations). The SL WTRU updates the configurations. In one or more cases, the configurations of the on-demand query of the SL channel reservations may include the Tx resource pools (e.g., but not limited to, time and frequency resources) of the channel reservation query (CRQ), the RX resource pools (e.g., but not limited to, time and frequency resources) of the corresponding query resource response (QRR). In one or more cases, a determination is made (603) as to whether a new SL is available for transmission. For example, the idle SL WTRU determines whether a new SL packet is available for transmission. For the cases in which the idle SL WTRU determines that there is not a new SL packet available for transmission (603:No), the idle SL WTRU remains asleep (605), for example, but not limited to deep sleep. For the cases in which the idle SL WTRU determines that there is a new SL packet available for transmission (603:Yes), the idle SL WTRU wakes up and transmits a channel query request to reachable active SL WTRUs (i.e., SL UEs), over the configured CRQ resource sets (607). For example, the SL WTRU may transmit a CRQ request indication during the next available CRQ opportunity.

In one or more cases, individual/accumulated query reservation responses are received (609). For example, SL WTRUs and/or SL WTRUs with active ongoing channel reservations may receive the individual/accumulated query reservation responses. In one or more cases, the query reservation responses may indicate the ongoing channel reservations from reachable active SL WTRUs (i.e., SL UEs). In one or more cases, transmitting SL WTRUs and/or SL WTRUs with active ongoing channel reservations, monitor and decode the CRQ occasions. In some cases which include transmitting SL half-duplex WTRUs, CRQ and QRR occasions are considered to be transmission gaps. In one or more cases, free SL resources from the configured Tx pools are selected (611). For example, the idle SL WTRUs may receive and decode the QRR reports and may select the free available channel resources for their SL packet transmissions. The idle SL WTRUs may trigger the SL paging procedure towards the intended SL WTRUs. In one or more cases, the idle SL WTRUs may select the free SL resources from the configured Tx pools, based on the signaled query responses from the surrounding SL UEs. In one or more cases, the 1st stage SCI is transmitted during the next SL paging occasion to an SL page of intended SL WTRUs (i.e., SL UE(s) (613). For example, the active SL WTRUs and/or SL WTRUs with active ongoing channel reservations may transmit the 1$^{st}$ stage SCI during the next SL paging occasion to the SL page of the intended SL WTRUs. As such, in one or more cases, the active SL WTRUs and/or SL WTRUs with active ongoing channel reservations transmit the SL packet over the selected resources. For the cases in which a CRQ request present (e.g., at 613), the active SL WTRUs and/or SL WTRUs with active ongoing channel reservations transmit their active channel reservations (e.g., but not limited to time and frequency SL resources) including the RRI, resource validity, and the estimated channel busy ratio to the requesting one or more IDLE SL WTRU(s).

Figure 7:
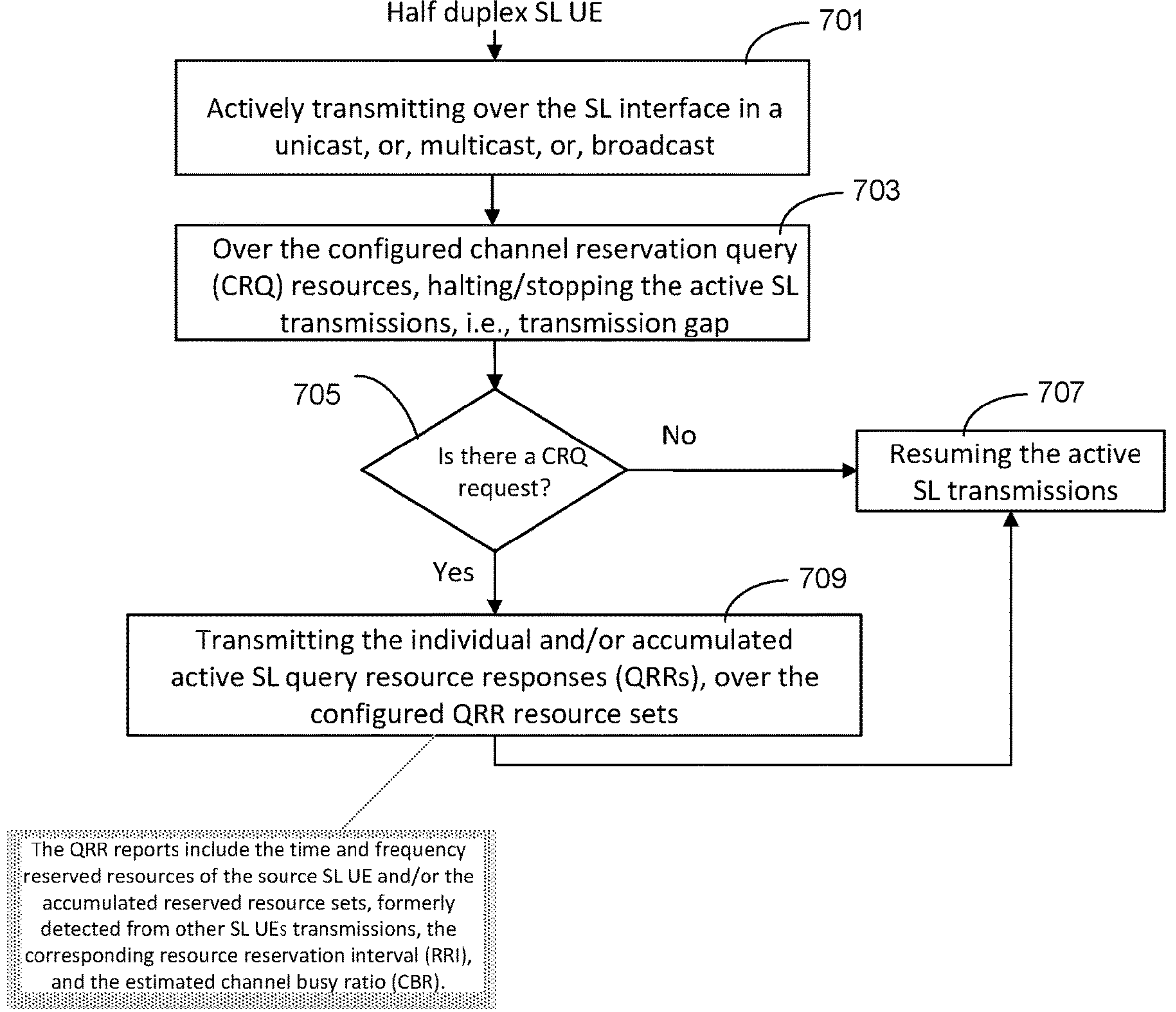
FIG. 7 is a flowchart summarizing a procedure for actively transmitting SL WTRUs to respond to at least a single channel reservation query (CRQ) indication.

In one or more cases, FIG. 7 illustrates a flowchart summarizing a procedure for actively transmitting SL WTRUs to respond to at least a single channel reservation query (CRQ) indication. For example, FIG. 7 illustrates an example process of an actively transmitting half duplex SL WTRUs responding to at least a single channel reservation query (CRQ) indication. In one or more cases, data is transmitted over an SL interface using any of unicast transmission, multicast transmission, and broadcast transmission (701). For example, the active SL WTRU(s) (e.g., half-duplex SL UE(s)) may actively transmit over the SL interface using any of unicast, multicast, and broadcast. In one or more cases, a transmission gap is created over the CRQ resources (703). For example, over the configured CRQ resource sets, the half-duplex SL WTRUs create a transmission gap. In one or more cases, the half-duplex SL WTRUs may create the transmission gap by halting/stopping their ongoing transmissions over the SL interface for the time period in which the half-duplex SL WTRUs expect to receive a potential CRQ request. In one or more cases, a determination is made (705) as to whether there is a CRQ request. For example, active SL WTRUs may monitor and decode the CRQ resource set and determine if there is a true CRQ request. For the cases in which the active SL WTRUs determine that there is not a CRQ request (705:No), the active SL WTRUs resume their active SL transmissions (707). For the cases in which the active SL WTRUs determine that there is a CRQ request (705:Yes), the active SL WTRUs transmit their individual and/or accumulated query resource response reports (QRRs) (709). In one or more cases, the active SL WTRUs may transmit their individual and/or accumulated QRRs over the configured QRR resource sets. In one or more cases, the QRRs include the reserved current and future resources of each active SL WTRU and/or accumulated in a single QRR report, the corresponding RRIs, and the estimated CBR values. For the cases in which the QRR resources expire, the active SL WTRUs resume their SL transmissions accordingly (707).

Figure 8:
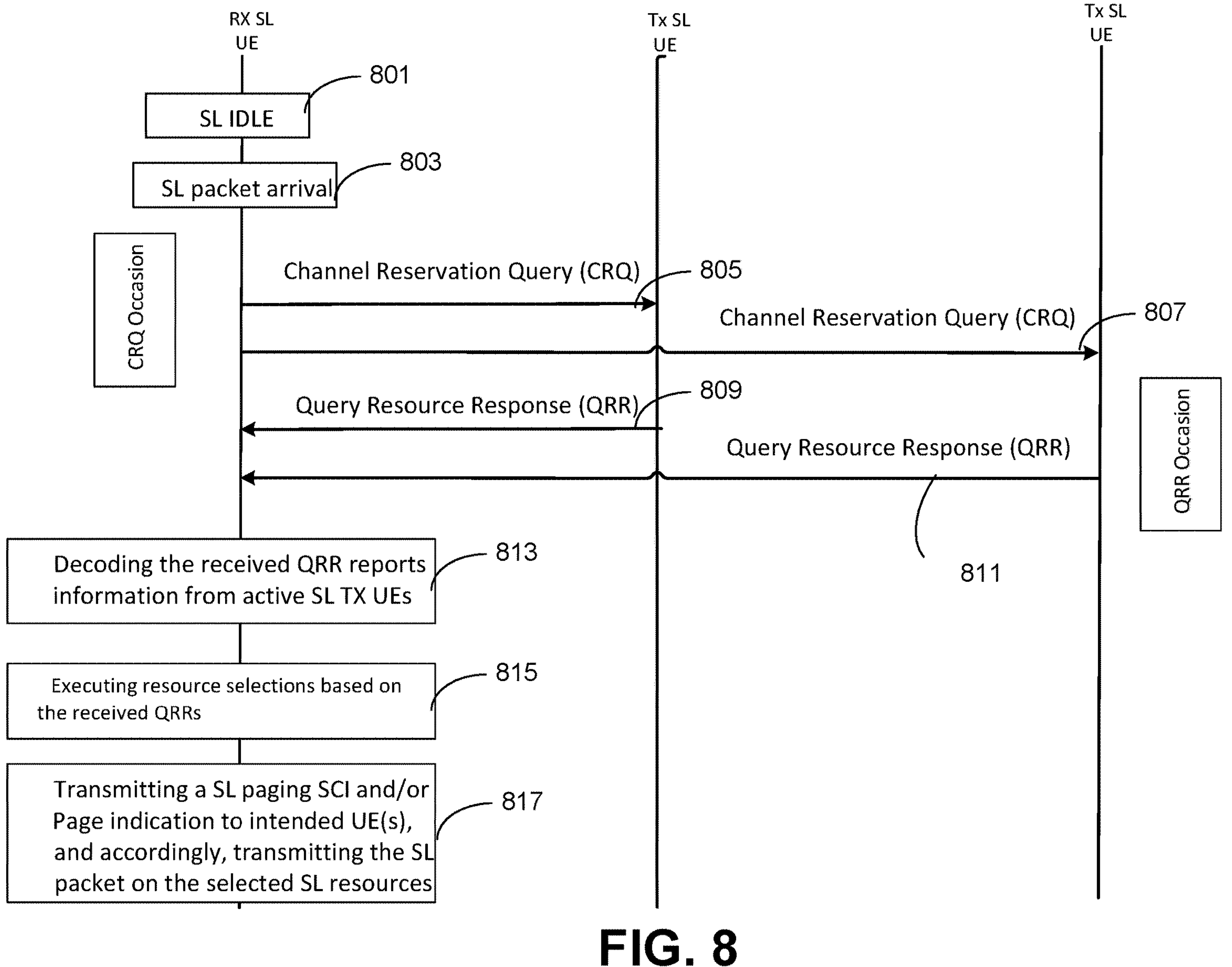
FIG. 8 is a timing diagram illustrating an on-demand channel reservation query of the SL interface.

FIG. 8 illustrates a time flow example of the on-demand channel reservation query over the SL interface. In this example, the SL WTRU is configured in idle state (801). In one or more cases, a SL packet arrives at a higher layer of the stack of the idle SL WTRU (803). The idle SL WTRU wakes up and transmits a CRQ request indication 805, 807 over the first available CRQ resource opportunity. Reachable active SL WTRUs respond with corresponding QRR reports 809, 811. In one or more cases, reachable active SL WTRUs may respond with the QRR reports 809, 811, using either the CDM-based or the sensing-based approach over the configured QRR resource sets. In one or more cases, the source SL WTRU decodes the received QRR reports (813). The source SL WTRU may decode the received QRR reports based on information from active SL Tx WTRUs (i.e., SL Tx UEs). In one or more cases, the source SL WTRU may identify the free available SL resources to use for its SL packet transmission. In one or more cases, the source SL WTRU selects resources for transmitting SL paging based on the QRR reports (815). The source SL WTRU transmits an early SL paging SCI and/or the first stage SCI within the first available paging occasion to intended WTRUs (817). In one or more cases, the early SL paging SCI and/or the first stage SCI indicates the selected free SL PSSCH resources for the actual SL packet transmission. In one or more cases, the source SL WTRU transmits the SL packet on the selected SL resources.

Figure 9:
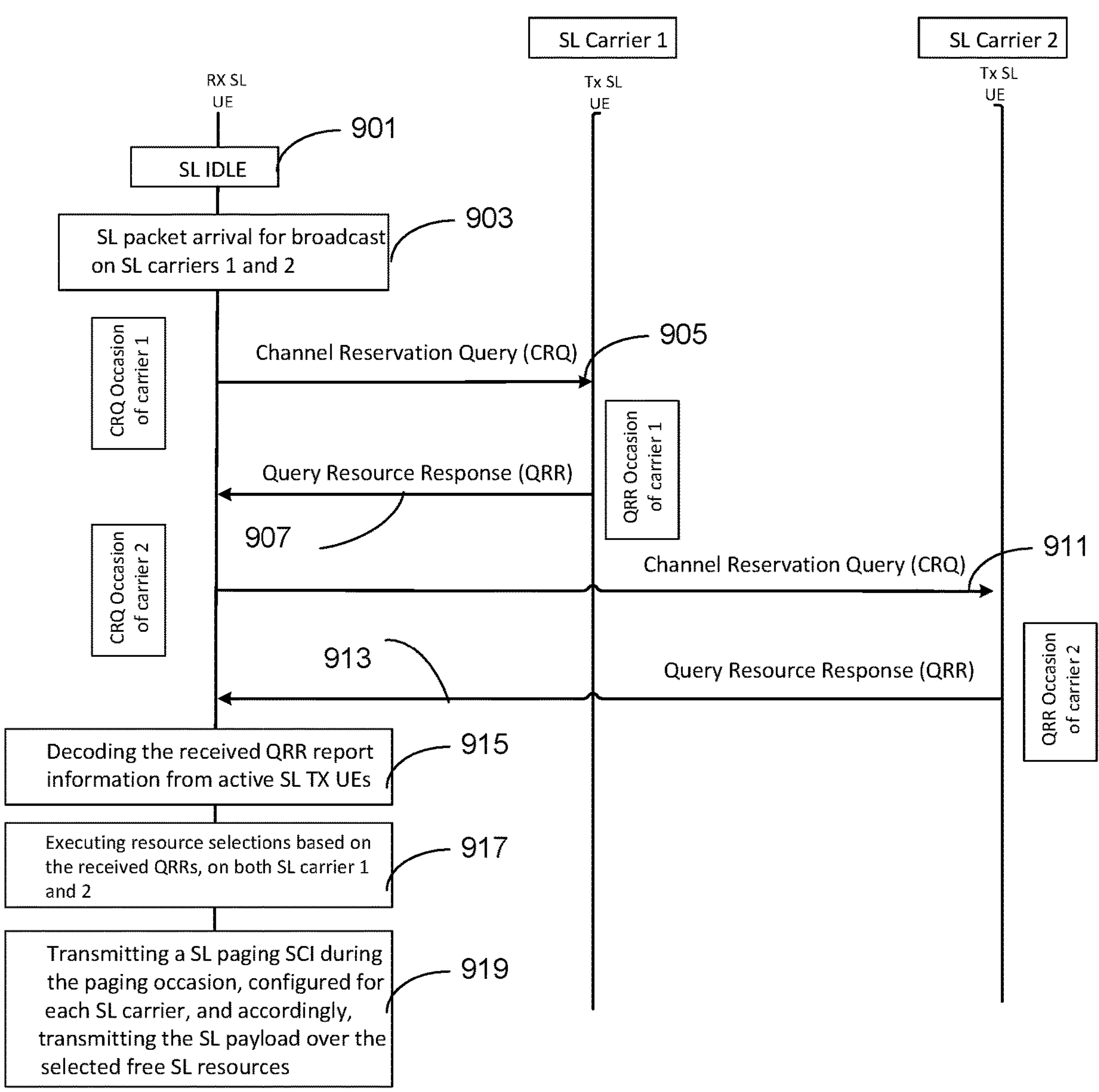
FIG. 9 is a timing diagram extending the example of FIG. 8 illustrating an on-demand channel reservation query of the SL interface to a SSL multi-carrier use case.

FIG. 9 is a timing diagram extending the example of FIG. 8 illustrating an on-demand channel reservation query of the SL interface to a SSL multi-carrier use case. That is, FIG. 9 extends the former example described in FIG. 8 to the SL multi-carrier use cases, where more than a single SL carrier is configured for SL transmissions. In one or more cases, the SL WTRU is configured in idle state (901). In this example, the CRQ and the corresponding QRR configurations (e.g., but not limited to, periodicity and frequency resources) may be configured for each of the SL carriers. In one or more cases, the CRQ and the corresponding QRR configurations are signaled to the SL WTRUs by the primary RAN node over the RAN interface. In some cases, the CRQ and the corresponding QRR configurations may be relayed from the primary RAN node by the SL relays over the PC5 interface towards remote out of RAN coverage SL WTRUs. In one or more cases, when an idle SL WTRU has a packet arrival for broadcast (903), the idle SL WTRU transmits the per-SL-carrier CRQ requests (905, 911) and accordingly receives potential QRR reports (907, 913) over both carriers (e.g., SL carriers 1 and 2). In one or more cases, a source idle SL WTRU decodes the received QRR reports (915). Further, the source idle SL WTRU identifies the free available SL resources to use for its SL packet transmission. In one or more cases, the source idle SL WTRU selects resources for transmitting SL paging based on the QRR reports (917). In some cases, the source idle SL WTRU executes resource selections based on the received QRRs, on both SL carrier 1 and 2. In one or more cases, the idle source SL WTRU triggers either the transmission of an early SL paging SCI and/or the per-SL-carrier 1st stage SCI during the per-SL-carrier paging occasion (919). In one or more cases, the idle source SL WTRU triggers either the transmission of an early SL paging SCI and/or the per-SL-carrier 1st stage SCI during the per-SL-carrier paging occasion to indicate the selected resources per SL carrier that are selected for the respective SL transmission. As such, a SL WTRU can transmit SL packet over multiple carriers without performing multiple partial sensing efforts.

In one or more cases, the WTRU may be configured to dynamically allocate the on-demand SL channel sensing resources (e.g., but not limited to QRR channels). With the on-demand sensing described herein, the QRR resources may be predefined and preconfigured from one or more of the RAN, SL service providers, and an elected SL WTRU (e.g., a self-selected or group selected SL WTRU). That is, all SL WTRUs acknowledge the CRQ and QRR resources. For active transmitting SL WTRUs, the active transmitting SL WTRUs consider the QRR resources as transmission gaps, in which the active transmitting SL WTRUs halt their ongoing SL transmissions or match their transmissions around those preconfigured resources. For SL WTRUs that have received and detect at least a single CRQ request, the SL WTRUs report the channel sensing related information in a QRR message including, for example, but not limited to, current and future channel reservations of these SL WTRUs. For other active transmitting SL WTRUs that are in proximity to the requesting WTRU but that have not received the CRQ request, these SL WTRUs may mute/halt/match their transmissions over/around QRR resources. In one or more cases, these SL WTRUs mute/halt/match their transmissions over/around QRR resources to not impose strong SL interference on the SL WTRUs in proximity that are transmitting their QRR reports. Typically, the CRQ resources are limited since the CRQ represents a simple request to receive channel sensing information, whereas the QRR resources could be extended over several OFDM symbols and/or slots in order to offer sufficient capacity for SL WTRUs in proximity to exchange their channel sensing information. Such fixed QRR resource allocation may result in an inefficient resource utilization in the SL sub-deployments or the SL zones over which SL WTRUs have a low SL packet transmission rate. For example, when there are few CRQ requests (e.g., a low SL packet transmission rate of the SL WTRUs supporting SL paging), few or no QRR report transmissions are required. That is, maintaining the fixed allocation of the QRR resources is inefficient and leads to SL capacity degradation. Thus, an inter SL WTRU coordination scheme is described to allow for dynamic allocation of the QRR resources. In one or more cases, the inter SL WTRU coordination scheme allocates and reserves the QRR resource set when one or more of the SL WTRUs within a SL communication zone has a SL packet for SL transmission. As such, the inter SL WTRU coordination scheme triggers the on-demand channel sensing and, accordingly, activates the QRR resource reservation for transmitting SL WTRUs to transmit their QRR reports.

Figure 10:
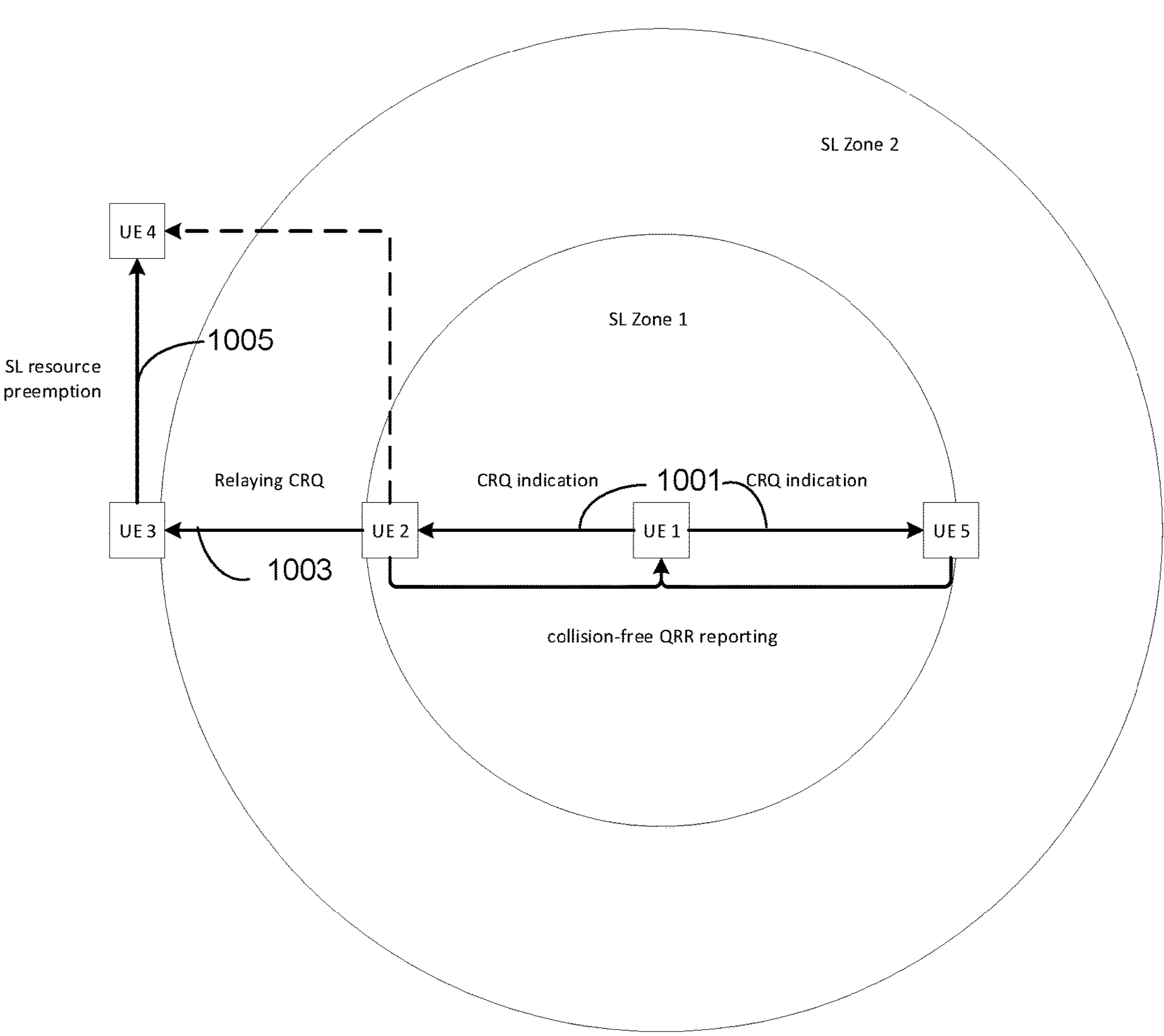
FIG. 10 is a diagram depicting dynamic allocation of a QRR resource set.

FIG. 10 depicts an example dynamic allocation of the QRR resource set. In one or more cases, the RAN/SL service provider configures the SL WTRUs with a predefined resource set for CRQ and QRR signals/messages, respectively. This entails multiple frequency resources/PRBs/subchannels over one or more of the SL OFDM symbols/slots. More particularly, the QRR resource set may be predefined but not actually reserved until needed. In one or more cases, the SL WTRUs by default consider that the QRR resource set is available for SL data payload reservation as long as there is not at least one received CRQ indication.

In one or more cases, SL WTRU 1 is the CRQ requesting WTRU since SL WTRU 1 is triggered by higher layer for SL packet transmission. In one or more cases, WTRU 1 transmits a CRQ request indication (1001) within one of the available CRQ configured resource sets. SL WTRU 2 receives the CRQ indication, and accordingly relays (1003) such request, in a broadcast manner to the SL WTRUs in proximity. In one or more cases, the CRQ relaying allows the SL WTRU to announce that the SL WTRU has received a CRQ request indication, and hence, the SL WTRU is required to activate and use the first available QRR resource set. In one or more cases, the surrounding SL transmissions over the QRR resource set are deferred, muted, and/or matched around QRR resources until the next QRR resource is expired. It is noted that not all the CRQ indication receiving SL WTRUs may be required to relay the CRQ indication, but only a subset of those SL WTRUs may be required to relay the CRQ indication. For example, a subset of the SL WTRUs may be required to relay the CRQ indication based on SL WTRU density in the SL zone and received signal strength of the CRQ indication.

In one or more other cases, upon receiving and announcing one or more CRQ requests, the next configured QRR resource set is immediately activated and SL traffic over those resources is preemptively halted. In this example, SL WTRU 4 is experiencing an ongoing SL reception (1005) from SL WTRU 3, in which part or all of the scheduled resources align with the QRR resource set. Upon receiving a CRQ announcement, the transmitting WTRU 3 preemptively mutes over the QRR resources since one or more of the SL WTRUs in proximity shall be transmitting QRR reports. This imposes a SL WTRU receiver interruption. In one or more cases, the SL WTRU 4 may assume that the SL WTRU 4 is receiving regular SL traffic over the QRR resources if the SL WTRU 4 did not receive the relayed CRQ request. This may lead to a packet reception failure and the triggering of a SL HARQ NACK. In such cases, the transmitting WTRU 3 transmits a preemptive QRR resource indication over the subsequent PSCCH channel opportunity to one or more of the receiving SL WTRUs, such as WTRU 4. In one or more cases, such indication informs the receiving WTRUs to flush the buffered payload received over the QRR resource set since the receiving WTRU is not the intended SL payload, but rather is one or more of the transmitted QRR reports. By flushing the buffered payload received over the QRR resource, the receiving WTRUs skip combining the preempted QRR traffic when the receiving WTRUs perform HARQ combining so as to not propagate the decoding error.

Figure 11:
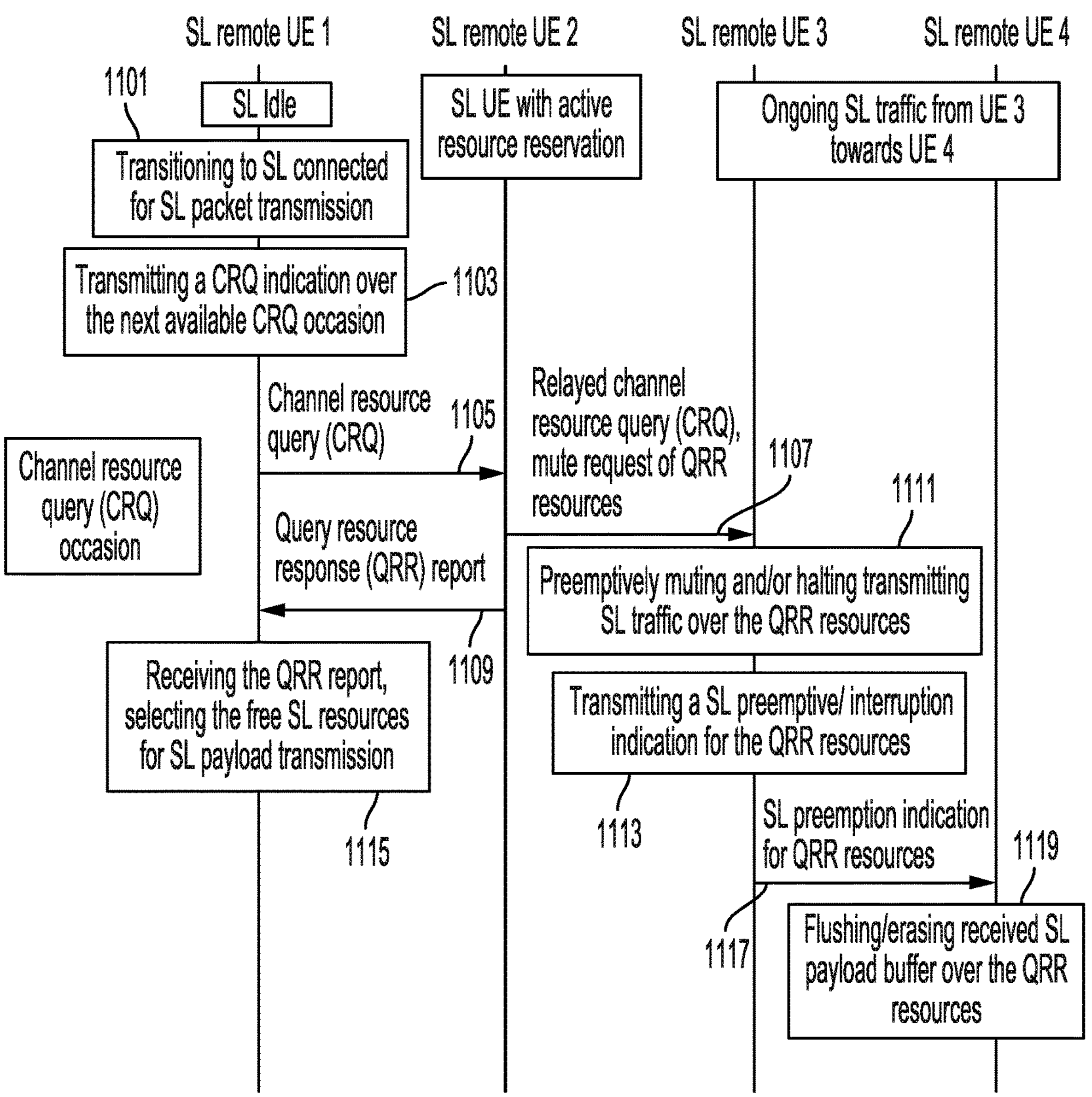
FIG. 11 is a signal flow diagram illustrating dynamic allocation of QRR resources.

FIG. 11 is a signal flow diagram illustrating dynamic allocation of QRR resources. FIG. 11, for example, summarizes the procedure of the dynamic QRR resource allocation and preemption and corresponding WTRU sequence actions. In this example, SL remote WTRU 1 is initially idle, SL remote WTRU 2 has an active resource reservation, and SL remote WTRUs 3 and 4 initially have ongoing SL traffic from WTRU 3 to WTRU 4. Also, in this example, a RAN node has transmitted and configured the various SL WTRUs 1, 2, 3, and 4 with a predefined set of the CRQ and QRR resources (not shown). It is noted that one or more of the RAN node, SL relays, SL service providers, and elected SL WTRUs may transmit and configure the various SL WTRUs 1, 2, 3, and 4 with a predefined set of the CRQ and QRR resources (not shown). In one or more cases, when data arrives at SL WTRU 1 for transmission via SL, SL WTRU transitions to SL connected state (1101) and configures itself to transmit a CRQ indication in the next available CRQ occasion (1103). In one or more cases, SL WTRU 1 transmits the CRQ (1105) to SL WTRUs in its vicinity, e.g., SL WTRU 2. In some cases, WTRUs that receive the CRQ may relay the CRQ to additional SL WTRUs in its vicinity. For example, SL WTRU 2 may relay the CRQ to SL WTRU 3 (1107) based on SL WTRU density and CRQ received signal strength. SL WTRU 1 may receive one or more QRRs (1109) responsive to the CRQ. In one or more cases, SL WTRU 1 analyzes the report(s) and selects free SL resources for transmitting its data (1115).

In one or more cases, a SL WTRU with an active SL transmission (e.g., SL WTRU 3), that receives the relayed/CRQ indication preemptively halts transmission on the SL resources of the next available QRR resource set (1111). In one or more cases, a SL WTRU (e.g., SL WTRU 3) with the active SL transmission receiving the relayed/CRQ indication, may determine a SL preemptive/interruption indication for the QRR resources (1113) and transmit (1117) the SL preemptive/interruption indication to one or more of the receiving SL WTRUs in proximity (e.g., SL WTRU 4) to be applicable over the QRR resource set. In one or more cases, upon receiving the SL traffic preemption indication, the SL WTRU with an active reception (e.g., SL WTRU 4), may flush the received SL payload buffer over the preempted QRR resource set (1119).

In one or more cases, the WTRU may be configured to accumulate QRR reporting. In one or more cases, to reduce and control the number of WTRUs monitoring the CRQ occasions and, thus, the number of WTRUs transmitting QRR reports, a single SL WTRU, instead, may transmit an accumulated QRR report, which contains the SL channel reservations of multiple SL WTRUs. That is, as the single SL WTRU may transmit the accumulated QRR report, each WTRUs having a channel reservation may not transmit its individual QRR report. In such cases, the SL WTRUs that do not need to transmit a QRR in response to the CRQ may continue transmitting on the SL interface (i.e., for the cases in which these SL WTRUs have ongoing SL transmissions), instead of introducing SL transmission gaps.

Figure 12:
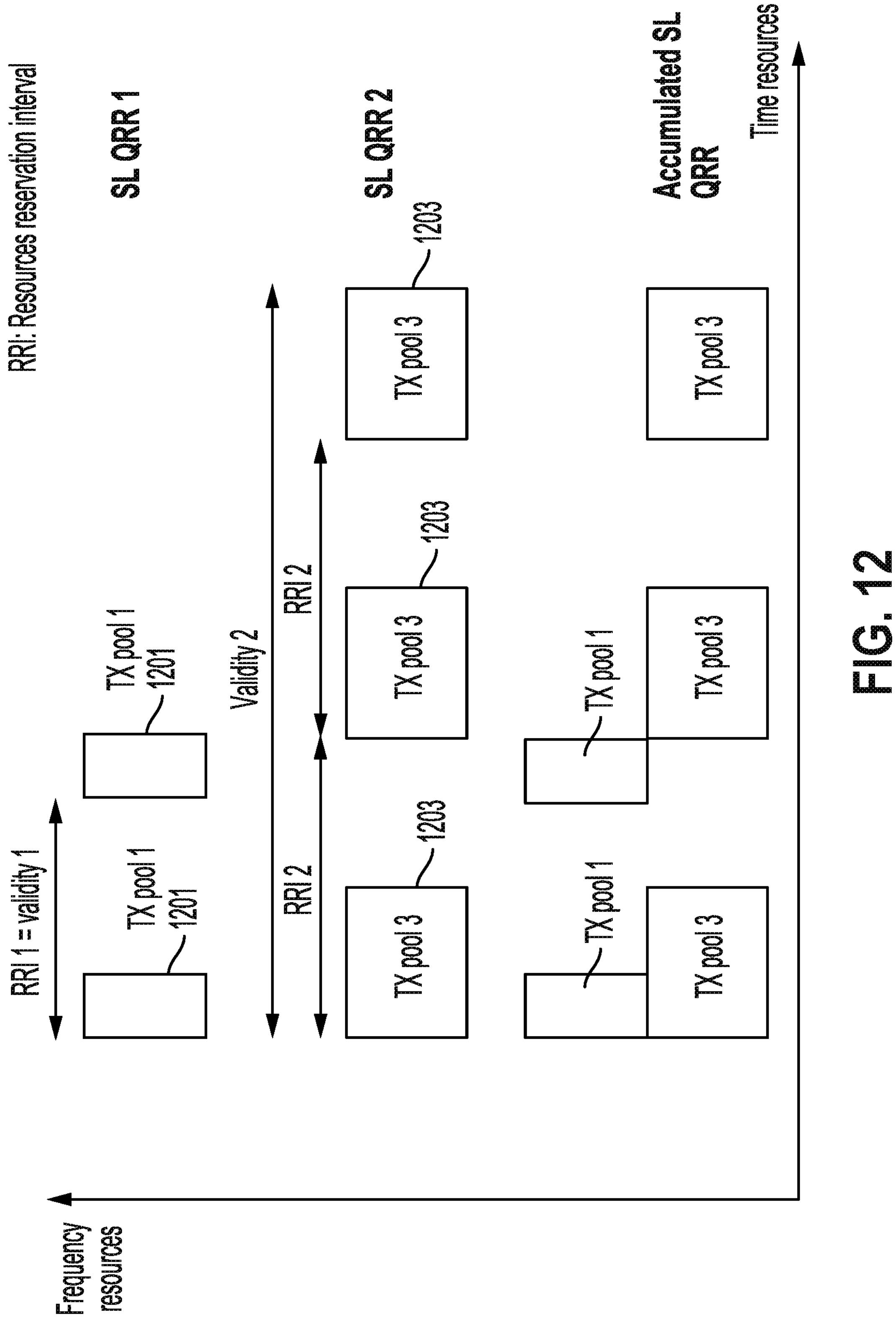
FIG. 12 is a diagram of time and frequency resources showing accumulated QRR reporting.

FIG. 12 is a time and frequency chart illustrating an example of accumulated QRR reporting. In this example, there are three SL WTRUs in proximity of each other, in which the first WTRU reserves the first transmission pool 1 1201 with a certain resource reservation interval (RRI) and a short resource validity period. The resource validity period indicates the duration over which the indicated resource reservation is valid. In this example, the second SL WTRU reserves a wider-bandwidth transmission pool 3 1203 with a longer validity duration. In one or more cases, the accumulated QRR reporting includes the combination of both resource reservation from the two SL WTRUs, as shown at the bottom of the time and frequency chart of FIG. 12. In one or more cases, this resource reservation is signaled in a single SL QRR reporting instant. In some cases, this QRR may be transmitted by either of the aforementioned two SL WTRUs. In other cases, this QRR may be transmitted by yet a third SL WTRU. It is noted that the actual QRR is not represented in FIG. 12, which demonstrates only the reserved resources, not the actual reporting thereof.

Figure 13:
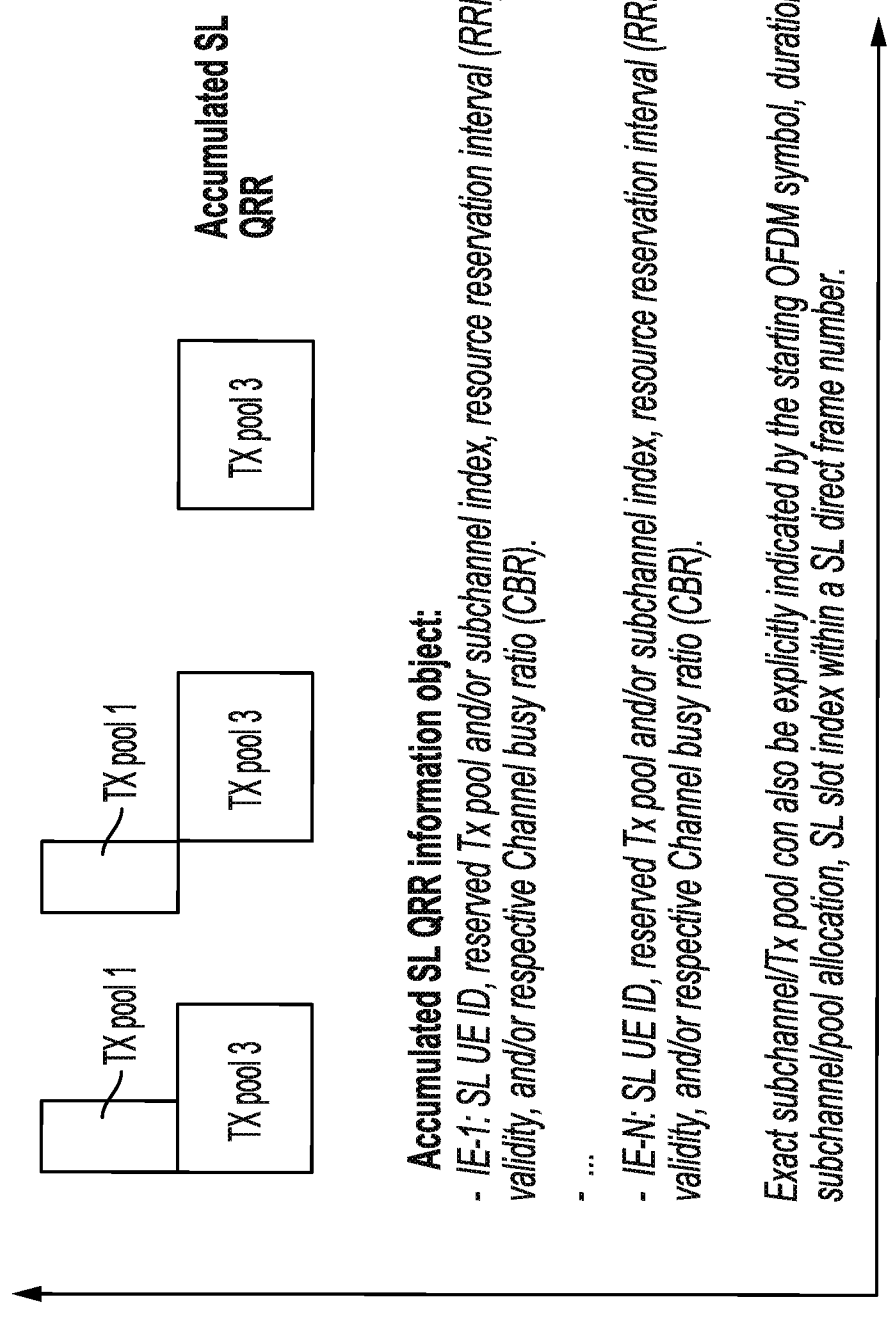
FIG. 13 is a diagram illustrating the contents of an exemplary accumulated QRR report.

FIG. 13 is diagram illustrating the contents of an exemplary accumulated QRR report. For example, FIG. 13 depicts the stage-3 contents of an accumulated QRR report. In one or more cases, the accumulated QRR report includes several new information elements of the channel reservations from the various SL WTRUs whose resource reservation data is included in such QRR report, as illustrated in FIG. 13. For example, the resource reservation data may include one or more of the reserved Tx pool indices, the SL subchannel indices, the corresponding RRI, the resource validity sample of the respective SL WTRU, and the estimated CBR sample of the respective SL WTRU. In one or more other cases, the timing and frequency resources may be signaled as part of the accumulated QRR report even more precisely, such as by specifically identifying, for example, but not limited to frequency PRBs (Physical Resource Blocks), OFDM symbols, duration of allocation, etc. In some cases, the accumulated QRR report includes one or more of the starting OFDM SL symbol, the direct frame number (DFN), allocation duration in number of OFDM symbols, slot index within the indicated DFN, and the corresponding subchannels and/or PRBs.

Figure 14:
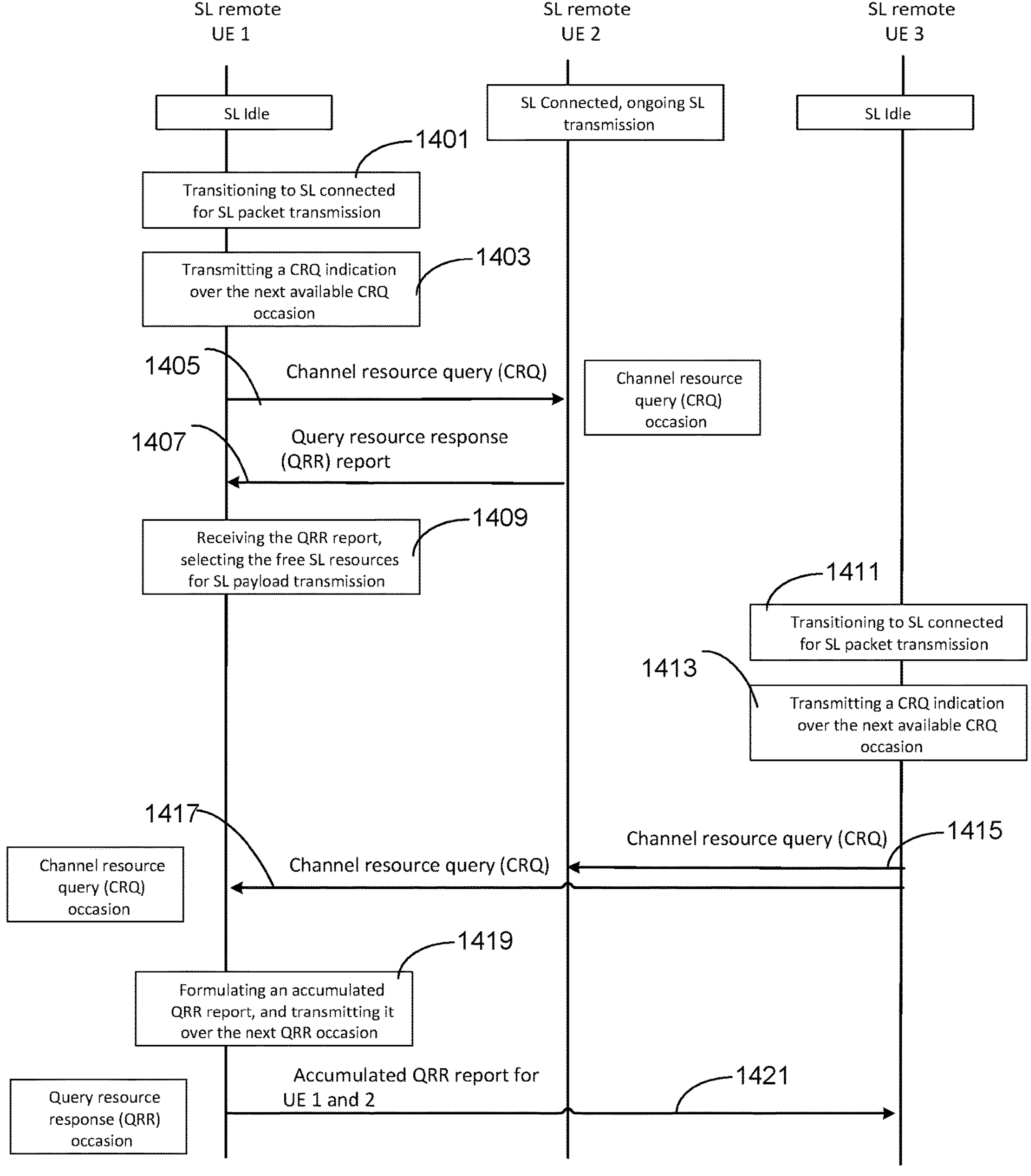
FIG. 14 is a signal flow diagram illustrating signal flow in accordance with the accumulated QRR reporting.

FIG. 14 is a signal flow diagram illustrating signal flow in accordance with the accumulated QRR reporting. For example, FIG. 14 illustrates signal flow in accordance with the procedure of the accumulated QRR reporting and corresponding WTRU sequence actions. In this example, SL WTRUs 1 and 3 are initially idle, and SL WTRU 2 is initially in SL Connected state and has ongoing SL transmissions. Further, data for transmission via SL arrives at SL WTRU 1. For the cases in which the SL WTRU 1 receives the data for transmission via SL, SL WTRU 1 transitions to SL Connected state (1401) In one or more cases, having transitioned to SL Connected state for SL packet transmission, SL WTRU 1 creates a CRQ indication (1403). The SL WTRU 1 may transmit the CRQ indication over the next available CRQ occasions. In one or more cases, the SL WTRU 1 transmits a CRQ message (1405) to SL WTRU 2. In one or more cases, SL WTRU 2 responds with a QRR (1407). Upon receiving the QRR, SL WTRU selects a set of free resources for its SL payload transmissions (1409). In one or more cases, at a subsequent time, data for transmission via SL arrives at SL WTRU 3. For the cases in which the SL WTRU 3 receives the data for transmission via SL, SL WTRU 3 transitions to SL Connected state (1411). In one or more cases, having transitioned to SL Connected state for SL packet transmission, SL WTRU 3 creates a CRQ indication (1413). The SL WTRU 3 transmits CRQ messages (1415, 1417) to SL WTRUs 1 and 2, respectively. Upon receiving the CRQ from SL WTRU 3, SL WTRU 1 selects free SL resources for SL WTRU 3 to use to transmit its payload data. SL WTRU 1 formulates an accumulated QRR report that includes the QRR data for SL WTRU 1 generated at (1409) as well as the QRR data formulated for SL WTRU 3 at (1419). In one or more cases, the SL WTRU 1 responds to SL WTRU 3's CRQ with an accumulated QRR (1421).

In one or more cases, a WTRU is configured with a channel access scheme for accumulated QRR reporting. For example, a channel access mechanism may transmit the accumulated QRR report over one of the QRR resource sets. In particular, the channel access mechanism may transmit the accumulated QRR report over one of the QRR resource sets to reduce the QRR reporting burden on SL WTRUs while distinguishing and prioritizing the transmission of the QRR reports. In some cases, the QRR reports include more inclusive information on the channel reservations (e.g., the reporting WTRU has been active for a sufficient amount of time, performing partial channel sensing, prior to formulating an accumulated QRR report, e.g., SL resource reservations and channel busy ratios). In some cases, due to the fully distributed SL transmissions and resource reservations, there may be many simultaneous QRR reports to be transmitted over the QRR resource sets. Furthermore, some of the transmitted QRR reports may be more informative than others due to the varying SL conditions of the reporting SL WTRUs. Thus, to address these issues, SL WTRUs utilize the channel access mechanism described herein to validate the quality of their QRR reports and determine whether or not the SL WTRUs should report the corresponding QRRs. Moreover, by addressing these issues, the channel access mechanism allows the SL WTRUs to not propagate channel sensing errors if one or more of the QRR reports are misleading.

In one or more cases, SL WTRUs are self-prioritized for transmitting the respective QRR reports. For example, SL WTRUs having more inclusive and informative QRR reports are prioritized to transmit those reports over QRR with less information or less important information. In another example, due to the limited QRR resource set, the lower prioritized SL WTRUs may defer their QRR transmissions, on, for example, an opportunistic basis, to later QRR resources. In one or more cases, SL WTRUs may be configured to consider one or more metrics to determine the quality of their respective QRR reports and their respective QRR transmission priority. For example, the QRR transmission priority can be the QRR access priority described below. In some cases, the SL WTRUs may be configured to consider one or more metrics. For example, a WTRU may consider an arbitrary number of samples of a sidelink channel metric prior to deciding the QRR transmissions (i.e., before each QRR reporting interval). The metrics may include one or more of the following. In some cases, the metrics may include a duration of time that the SL WTRU has been in SL connected mode prior to the preconfigured QRR resource set. For example, if a WTRU has been in SL idle mode for a relatively long time prior to the current QRR resource set, the WTRU may have a lower probability of being able to detect all the SL channel reservations in proximity. As such, it may be advisable to assign a relatively lower QRR report transmission priority to this WTRU. In some cases, the metrics may include determining the QRR report transmission priority level for the response based on one or more of a length of time the WTRU has been monitoring sidelink resource usage or a number of other responses regarding sidelink resource usage received by the WTRU over a previous period of time. Moreover, in some cases, the metrics may include a number of instants/density of monitored and detected QRR resources/reports during a certain period of time prior to the current QRR resource set. For example, the denser the previous QRR monitoring instants, the more inclusive and informative the current accumulated QRR report is likely to be. As such, it may be advisable to assign a relatively higher QRR access priority to this WTRU. In some cases, the metrics may include SL mobility conditions of the reporting SL WTRU. For example, for a highly mobile SL WTRU, in addition to the possibility of having many failed receptions of the CRQ and QRR reports due to the high mobility, the reported QRR may contain the channel reservation information for non-reachable WTRUs (i.e., WTRUs which are NOT in proximity of the CRQ requesting SL WTRU(s).

In one or more cases, in order to avoid SL WTRUs considering channel reservations of other SL WTRUs that are not in proximity, the QRR reports may contain the SL ID (e.g., SL RNTI or TMSI) of the SL WTRU associated with each of the channel reservation information elements (IEs), as illustrated in FIG. 13. As such, the CRQ-requesting WTRU may skip the IEs for the SL WTRUs that are NOT discovered (i.e., those WTRUs that are not identified from the periodic SL discovery).

In one or more cases, a SL WTRU procedure may combine any of the aforementioned metrics to determine a corresponding SL QRR access priority. The access priority of a SL WTRU determines a corresponding SL contention window.

In one or more cases, the SL WTRU determines a probability distribution for the QRR resource set selection within the contention window. More particularly, for example, based on the determined access priority, the WTRU may determine a certain probability for transmitting its own QRR report on a certain resource set. Thus, each resource set will have a probability, and the WTRU transmits the QRR report having the highest probability. A contention window may be defined by a minimum and a maximum length of time. The minimum and a maximum length of time of the contention window implies the minimum and maximum number of SL symbols or slots over which the QRR resource sets are preconfigured, and over which the SL WTRU will be attempting to transmit the QRR report. In one or more cases, the definitions of the access priority and its association with the various defined SL contention windows and the probability distribution for QRR resource set selection may be configured by the RAN. In one or more cases, the definitions of the access priority and its association with the various defined SL contention windows and the probability distribution for QRR resource set selection may be relayed from the SL relays and/or SL service providers. The SL WTRU may randomly, according to the configured probability distribution, select a QRR contention value (i.e., a QRR resource set) within the minimum and maximum contention window thresholds based on the determined SL access priority. The SL WTRU may monitor one, more, or all the QRR resource sets within the contention window and prior to its selected QRR resource set. In one or more cases, on a condition that the SL QRR resources are determined to be idle, the SL WTRU triggers the transmission of the QRR report at the selected QRR resource set. In one or more other cases, if one or more of the QRR resource monitoring instants are deemed busy with other SL WTRU QRR transmissions, the SL WTRU may compare received QRR reports to its generated one and may refrain from QRR report transmission at the selected QRR resource set based on the comparison result. For example, the SL WTRU may compare received QRR reports to its generated one and may refrain from QRR report transmission at the selected QRR resource set if one or more of the received QRR reports already contains the same or better information as its own QRR report.

In one or more cases, a SL WTRU of a less inclusive QRR report may be assigned a lower SL QRR access priority. A corresponding QRR SL contention window and resource set selection's probability distribution may be configured to ensure any of the following. For example, the corresponding QRR SL contention window and resource set selection's probability distribution may be configured to restrict the SL WTRU from transmitting the QRR report during the current QRR resource set's interval. In one or more cases, the SL WTRU may be restricted by setting the minimum contention window threshold to the maximum QRR resource length. Thus, the SL WTRU will not transmit the QRR report within the current QRR resource set's interval. In another example, the corresponding QRR SL contention window and resource set selection's probability distribution may be configured to defer the QRR transmission over the current QRR resource set. For instance, in an example in which the QRR resource is 10 slots, the SL WTRUs with a lower access priority may be allowed to start determining if it can transmit the QRR report only from the seventh slot on. This leaves the first 6 QRR slots for QRR transmissions from higher-priority SL WTRUs.

In one or more cases, during the QRR monitoring time of a SL WTRU, due to its calculated contention window, the SL WTRU may monitor (e.g., but not limited to always monitor) the QRR resource set and the transmitted QRR reports from the other SL WTRUs in proximity. The SL WTRU may compare the received QRR reports with its own QRR report (i.e., which is awaiting transmission). For example, for the cases in which the SL WTRU determines a full match and/or that the SL WTRU received a better/more inclusive QRR report than its own QRR report, the SL WTRU may refrain from the QRR transmission and update its own channel sensing information. In another example, for the cases in which the SL WTRU determines that its own QRR report is better/more inclusive than the received QRR report, the SL WTRU may transmit its own QRR report according to the configured SL QRR contention window and selected parameter values.

In one or more cases, the response window may be usable for a sidelink shared channel transmission on condition that a query requesting an indication of sidelink resources utilized by one or more WTRUs is not received by the WTRU.

In one or more cases, the CRQ requesting SL WTRU receives all or a plurality of possible QRRs during the configured QRR resource sets' interval. Accordingly, the CRQ requesting SL WTRU may combine the channel sensing information prior to its intended SL payload transmission.

Figure 15:
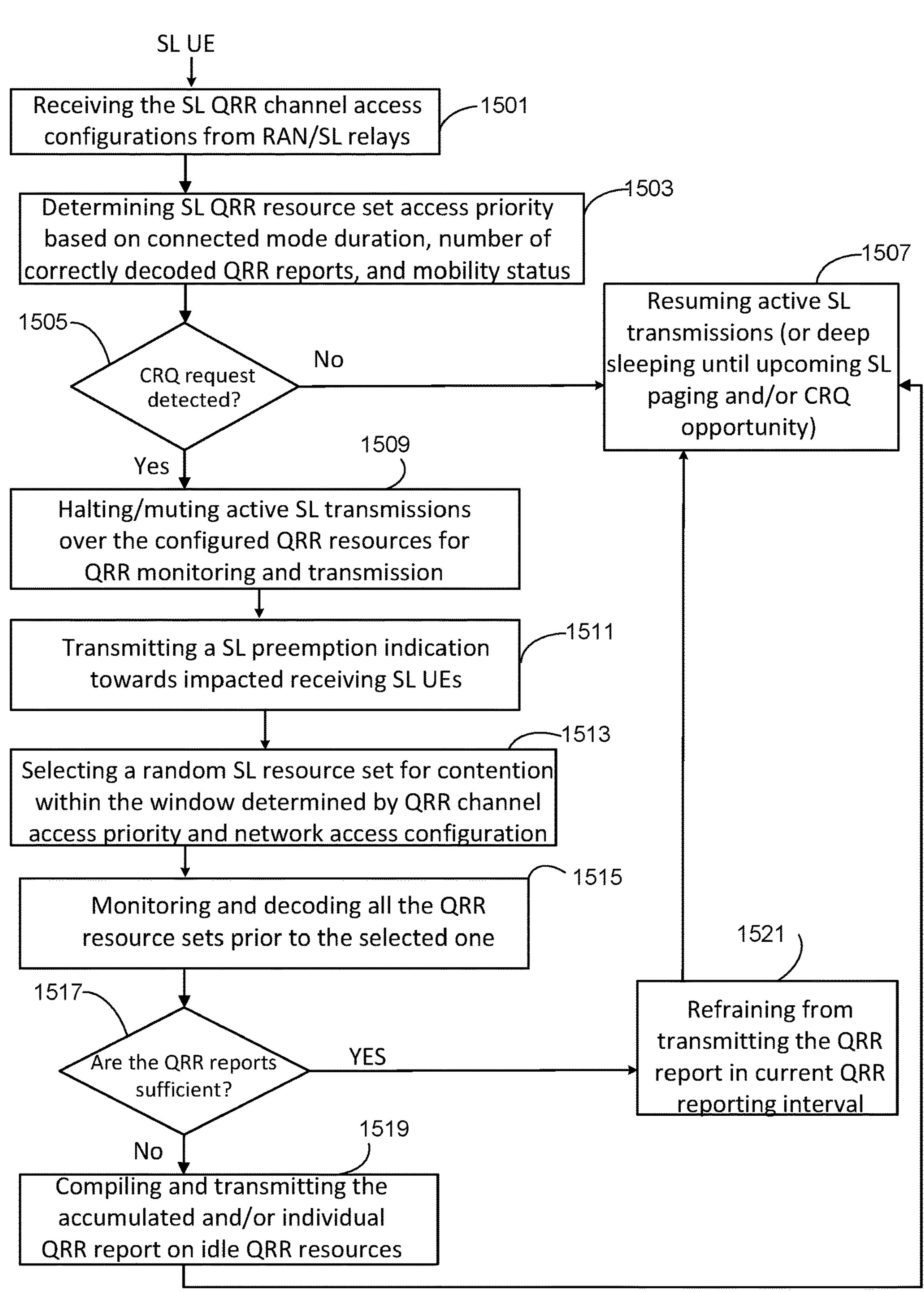
FIG. 15 is a flowchart illustrating a procedure for QRR channel access.

FIG. 15 is a flowchart illustrating a procedure for QRR channel access and corresponding WTRU sequence actions.

In one or more cases, the SL QRR channel access configurations are received from RAN/SL relays (1501). For example, the SL WTRU may receive from a RAN node and/or SL relay configurations of the SL QRR channel access. In some cases, the configurations of the SL QRR channel access may include one or more of the SL access priorities, SL QRR contention window parameters, and the corresponding mapping between the determined access priority and the SL contention window. In one or more cases, a SL QRR resource set access priority is determined (1503). For example, SL WTRUs, upon receiving one or more CRQ request(s), may determine the SL access priority based on one or more of the dynamically changing SL conditions, including SL mobility conditions, connected mode duration, and number of formerly correct QRR detections during a validity period prior to the current QRR resource sets' interval. In one or more cases, a determination is made as to whether a CRQ request is detected (1505). For example, the SL WTRU may determine whether a CRQ request is detected (i.e., whether the SL WTRU has a CRQ ready) For example, the SL WTRU may determine a CRQ is ready when new data has arrived at the SL WTRU that needs to be transmitted via SL. For the cases in which the SL WTRU determines that the CRQ request is not detected (1505:NO), the SL WTRU resumes for example, but not limited to, actively transmitting on a SL or deep sleeping until an upcoming SL paging and/or CRQ opportunity (1507).

For the cases in which the SL WTRU determines that the CRQ request is detected (i.e., a CRQ request is pending) (1505:Yes), the SL WTRU halts/mutes active SL transmissions over the configured QRR resources in a same or similar manner as previously discussed (1509). For example, the SL WTRU halts or mutes active SL transmissions over the configured QRR resources for QRR monitoring and transmission.

In one or more cases, a SL preemption indication is transmitted (1511). For example, the SL WTRU may transmit a SL preemption indication towards impacted receiving SL WTRUs (i.e., SL UEs) (1511). In one or more cases, an impacted SL WTRU may include one or more of those impacted by a the CRQ and/or QRR, such as previously described in connection with, e.g., FIG. 11. In one or more cases, a random SL resource set for contention within a window is selected (1513). For example, the SL WTRU selects a random SL resource set for contention within the window (e.g., a SL contention window) determined by QRR channel access priority and network access configuration. In some cases, the SL WTRU determines the corresponding SL contention window configuration to be used for QRR channel access and selects a random contention threshold (i.e., a QRR resource set) within the respective contention window. In one or more cases, a plurality or all of the QRR resource sets prior to the selected one are monitored and decoded (1515). For example, the SL WTRUs may monitor the QRR resource sets prior to the selected one and may decode the QRR reports from other SL WTRUs in proximity.

In one or more cases, a determination is made as to whether the QRR reports are sufficient (1517). For example, the SL WTRU may determine whether the preceding QRR reports corresponding to 1515 have enough information that the SL WTRU does not need to send its own QRR report. For example, the SL WTRU may determine that the preceding QRR reports include enough information when, for example, but not limited to, a preceding/higher-priority QRR report matches its own QRR report or is more inclusive of channel sensing information. For the cases in which the SL WTRU determines that the QRR reports are sufficient (1517:Yes), the SL WTRU refrains from transmitting its QRR report at the selected QRR resource set (1521). In one or more cases, the SL WTRU refrains from transmitting the QRR report in the current QRR reporting interval. For the cases in which the SL WTRU determines that the QRR reports are not sufficient (1517:No), the SL WTRU compiles and transmits its accumulated and/or individual QRR report on the selected QRR resources (i.e., if they are idle) (1519). In one or more cases, the SL WTRU resumes for example, but not limited to, actively transmitting on a SL or deep sleeping until an upcoming SL paging and/or CRQ opportunity (1507).

In one or more cases, the WTRU is configured to provide incremental feedback of the channel reservation reporting. In one or more instances, (e.g., referring to the cases which may or may not utilize partial sensing), there may be cases of power-limited SL WTRUs that may (e.g., be able to completely) avoid SL channel sensing while acquiring active SL channel reservations and/or assignments. For example, power-limited SL WTRUs that may avoid SL channel sensing while acquiring active SL channel reservations and/or assignments with an on-demand basis in a case where the SL WTRU has a SL packet available for transmission. In such cases, SL WTRUs (e.g., those in proximity) may report back the active channel reservations (i.e., from the perspective of each SL WTRU), towards the requesting SL WTRU. In such a case, over the (e.g., new, proposed, etc.) feedback channel, multiple SL WTRUs may transmit the corresponding channel reservation report. The corresponding channel reservation report may be for example, but not limited to, query resource response (QRR). In one or more cases, a QRR report may include (e.g., entail) an aggregate and/or overall set of the active channel reservations and/or assignments. In some cases, for example, QRR report may include one or both of an aggregate and overall set of the active channel reservations and/or assignments as detected at the transmitting SL WTRU. Such QRR report may include each SL WTRU's own active channel reservations and channel assignments and/or reservations of other SL WTRUs in proximity and detected at the transmitting SL WTRU during former channel sensing occasions and/or QRR occasions, respectively.

In one or more instances, (e.g., referring to the cases which may or may not utilize partial sensing), there may be cases where (e.g., a typical SL deployment) a large number of SL WTRUs may be (e.g., present) in proximity to one another, and channel reservation QRR reports from several SL WTRUs may contain overlapping and/or similar channel information. In such cases, such overlapping and/or similar channel information may be attributed to the SL WTRUs, in proximity, having almost concurrent channel sensing instants (e.g., instances) and/or QRR reporting instants, such that they detect a similar channel reservation. In such cases, SL WTRUs may (e.g., in response to a CRQ request) transmit almost similar QRR reports, which may, for example, impose additional and unnecessary power consumption of the SL WTRUs and increase the (e.g., needed, required, requested, etc.) feedback latency.

In one or more cases, SL WTRUs (e.g., during the occurrence of feedback channel resources) may monitor and/or decode the other QRR reports (e.g., via channel reservation reporting) from other SL WTRUs in proximity. In one or more cases, the sequence and/or order of the SL WTRUs transmitting the QRR reports over the feedback channel resources is handled by the proposed channel access scheme, as discussed below. In one or more cases, SL WTRUs may receive second response to the query prior to transmitting the response to the query. In one or more cases, the second response may be received from another WTRU. In one or more cases, the SL WTRUs may update the response based on sidelink resource usage information included in the second query. In one or more cases, SL WTRUs may determine the reported active reserved channel resource set from the preceding SL WTRUs. For example, on condition that: SL WTRUs have unique channel reservation entries, in their compiled aggregate QRR reports, and which are not present in any of the decoded QRR reports from other SL WTRUs during the current the QRR feedback channel period, the SL WTRUs may compile an incremental QRR report including the unique channel reservation sets. In some cases, the SL WTRUs may compile the incremental QRR report including, for example, only the unique channel reservation sets. In one or more cases in which the SL WTRUs decode QRR reports from other SL WTRUs and determine that there are no unique channel reservation sets in their own QRR reports, the SL WTRUs may erase the compiled and/or buffered aggregate QRR reports and may skip transmitting those QRR reports during the current QRR channel occasion.

Figure 16:
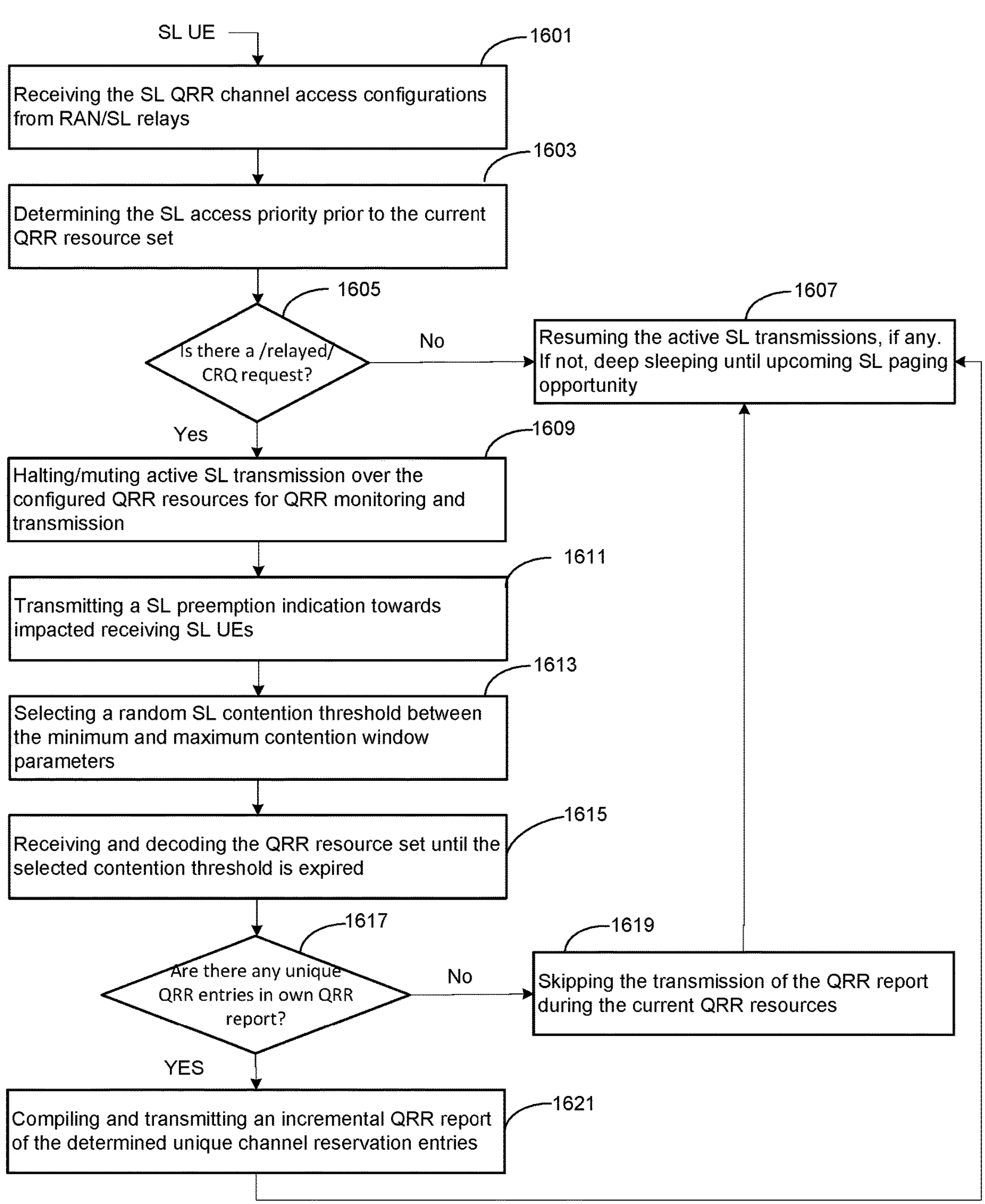
FIG. 16 is a diagram illustrating QRR incremental feedback reporting and corresponding WTRU sequence actions.

FIG. 16 is a diagram illustrating QRR incremental feedback reporting and corresponding WTRU sequence actions.

According to embodiments, referring to FIG. 16, any of the following operations may be performed. In one or more cases, SL WTRUs may receive a channel resource query from at least one SL WTRU in proximity. In one or more cases, SL WTRUs, based on the determined channel access priority, may monitor and decode the transmitted QRR reports over the current QRR resource sets preceding their determined QRR resource occasions. In one or more cases, on a condition that unique channel reservation entries are determined and compared to decoded QRR reports, SL WTRUs may compile and transmit an incremental QRR report of the unique channel reservation resources sets. In one or more cases, on a condition that no unique channel reservation entries are determined and compared to decoded QRR reports, SL WTRUs may erase the compiled and/or buffered QRR report and may skip transmitting the QRR report during the current QRR occasion.

In one or more cases, a SL WTRU may receive the SL QRR channel access configurations from RAN and/or SL relays (1601). In one or more cases, the SL WTRU may determine the SL access priority prior to the current QRR resource set (1603). In one or more cases, the SL WTRU may determine whether there is a (e.g., relayed) CRQ request (1605). For the cases in which the SL WTRU determines that there is not a CRQ request (1605:NO), the SL WTRU may resume the active SL transmissions and or may deep sleep until an upcoming SL paging opportunity (1607). For the cases in which the SL WTRU determines that there is a CRQ request (1605:YES), the SL WTRU may halt and/or mute active SL transmission over the configured QRR resources for QRR monitoring and transmission (1609). In one or more cases, the SL WTRU may transmit a SL preemption indication towards impacted receiving SL WTRUs (i.e., SL UEs) (1611). In one or more cases, the SL WTRU may select a random SL contention threshold between the minimum and maximum contention window parameters (1613). In one or more cases, the SL WTRU may receive and decode the QRR resource set until the selected contention threshold is expired (1615). In one or more cases, SL WTRU may determine whether there are any unique QRR entries in its own QRR report (1617). For the cases in which the SL WTRU determines there are not any unique QRR entries in its own QRR report (1617:NO), the SL WTRU may skip transmitting the QRR report during the current QRR resources (1619). For the cases in which the SL WTRU determines there are any unique QRR entries in its own QRR report (1617:YES), the SL WTRU may compile and transmit an incremental QRR report of the determined unique channel reservation entries (1621). Further, SL WTRU may resume the active SL transmissions and/or perform deep sleeping until an upcoming SL paging opportunity (1607).

In one or more cases, the WTRU is configured with a dynamic channel access procedure for SL QRR reporting. For example, in cases receiving a channel reservation query (CRQ) request, SL WTRUs in proximity may report back the query resource response (QRR) reports. In one or more cases, the QRR reports may include the active channel reservations from the perspective of each SL WTRU. In such cases, a QRR channel access scheme may regulate the transmission of the QRR reports from the SL WTRUs in proximity and resolve potential collisions. To regulate the transmission of the QRR reports, SL WTRUs may determine the QRR channel resource access priority. Further, the SL WTRUs may determine the corresponding QRR channel contention window. Moreover, the SL WTRUs may receive and decode the received QRR reports over the QRR resources during the determined contention window. For the cases in which a collision is detected during the contention window, the SL WTRUs may defer and/or skip the QRR report transmission during the current QRR channel occasion. In such cases, the SL WTRUs (i.e., SL UEs) may dynamically extend their contention windows according to a preconfigured pattern upon detecting one or more collisions during the former QRR resources. For the cases in which no collisions are detected during the latest determined contention window, the SL WTRUs may transmit the compiled full or incremental QRR report.

In one or more cases, SL WTRUs may receive, for example, from one or more of the RAN node, SL relay and SL service provider any of the performance metrics, corresponding performance thresholds, QRR channel access priorities, and respective contention windows, respectively. In such cases, a SL WTRU may determine its performance metrics including the sidelink connection time, number of prior QRR detections, and mobility conditions, respectively. In some cases, the SL WTRU may determine its performance metrics prior to the QRR resource occasion. In such cases, SL WTRUs may map the overall performance metrics. In some cases, the SL WTRUs may map the overall performance metrics, according to the predefined performance thresholds, to a QRR access priority class and accordingly to a contention window. A detailed dynamic procedure for mapping the performance metrics to the predefined QRR access priorities is discussed below.

In one or more cases, SL WTRUs of the highest QRR access priority may transmit their own or accumulated QRR reports over the resource sets configured for such access priority class. In one or more cases, SL WTRUs may perform a short channel sensing period before the actual QRR report transmission to determine if the QRR resource is idle or not. In such case, a collision may possibly occur as more than one SL WTRU of the same access priority is transmitting the corresponding QRR report at the same time. In a case of a collision, the receiving SL WTRU, which has originally requested the QRR reporting, may not be able to decode the multiple QRR reports. For instance, the receiving SL WTRU may not be able to decode the multiple QRR reports due to the strong resource interference (e.g., QRR collision). For the cases in which the SL WTRUs transmitting the QRR reports belong to the highest access priority, the collided QRR reports may not be credible and may not be inclusive of channel reservations and/or assignments, which may lead to a significant performance loss of the overall SL interface.

In one or more cases, SL WTRUs (e.g., of all QRR access priorities) may receive and decode the transmitted QRR reports from other SL WTRUs of the same of different access priorities. The SL WTRUs may act according to any of the following conditions. In cases where a QRR resource collision is detected (i.e., a first condition), SL WTRUs may update the current QRR resource configurations. In one or more cases, SL WTRUs having lower QRR access priorities may either defer or completely skip their QRR report transmissions during the current QRR occasion. By deferring or skipping their QRR report transmissions, the SL WTRUs having lower QRR access priorities allow for the QRR report retransmissions of the higher access priority SL WTRUs (e.g., since the latter are likely more credible and inclusive channel reservation reports). In such cases, the SL WTRUs of the current access priority may update their QRR resource validity by an extended one or more resource set. In one or more cases, the SL WTRUs of the current access priority may update their QRR resource validity by an extended one or more resource set according to the RAN node/SL relay pre-configurations. In such cases, SL WTRUs of the highest access priority may trigger a random back off offset over the extended QRR resource validity and accordingly, may retransmit the respective QRR reports. In one or more cases, the SL WTRUs of the lower QRR access priorities may follow the updated QRR resource configurations and validity by deferring and/or skipping the QRR report transmissions over the current QRR occasion, in which a QRR transmission offset may be pre-configured. In one or more cases, SL WTRUs may delay their QRR transmission by such offset in a case of a collision of a higher QRR access priority is detected. In case multiple successive collisions of a higher QRR access priority occur, the SL WTRUs of the lower QRR access priorities may keep deferring their QRR transmission until it becomes not possible to transmit their QRR reports during the current QRR occasion, which may be when the QRR occasion is expired. In cases where a QRR resource collision is not detected (i.e., a second condition), SL WTRUs may transmit any of their own, accumulated, and incremental QRR reports, over the QRR resources associated with each access priority.

Figure 17A:
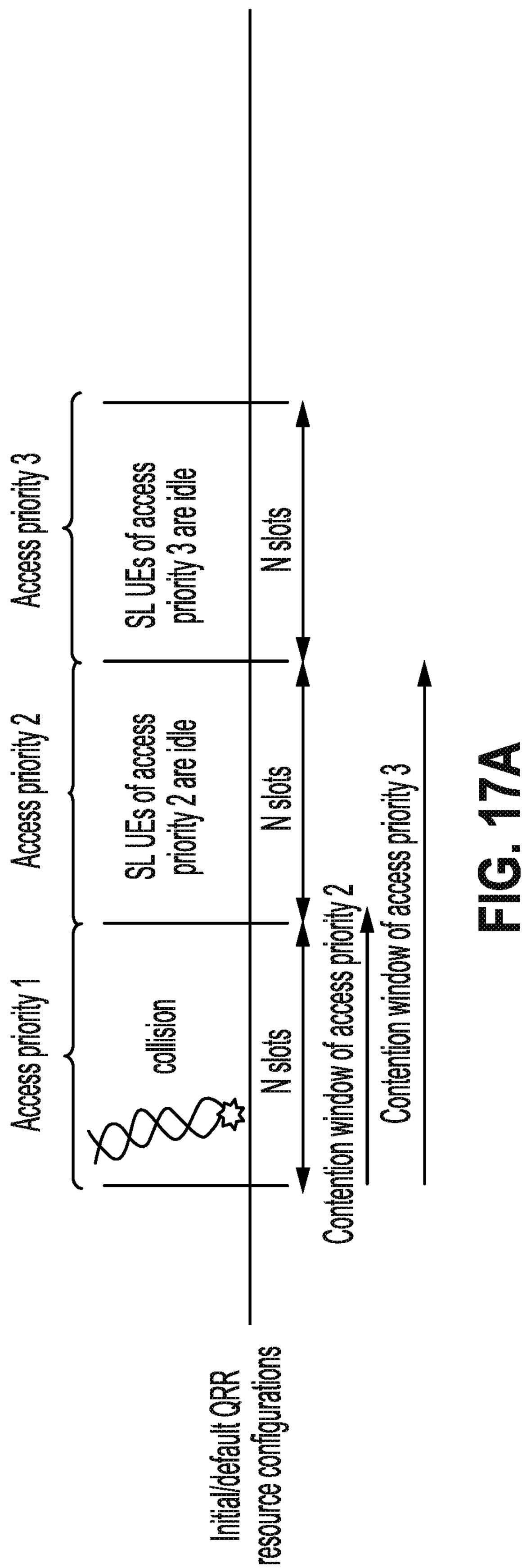
FIGS. 17*a*-17C are diagrams illustrating dynamic SL WTRU QRR channel access.
Figure 17B:
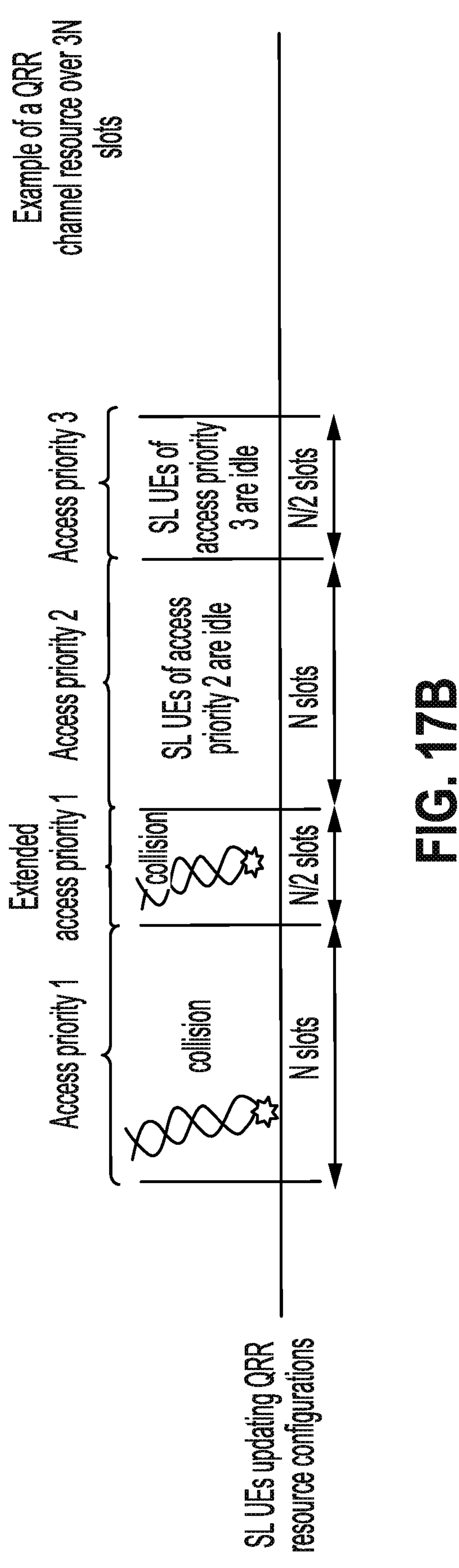
Figure 17C:
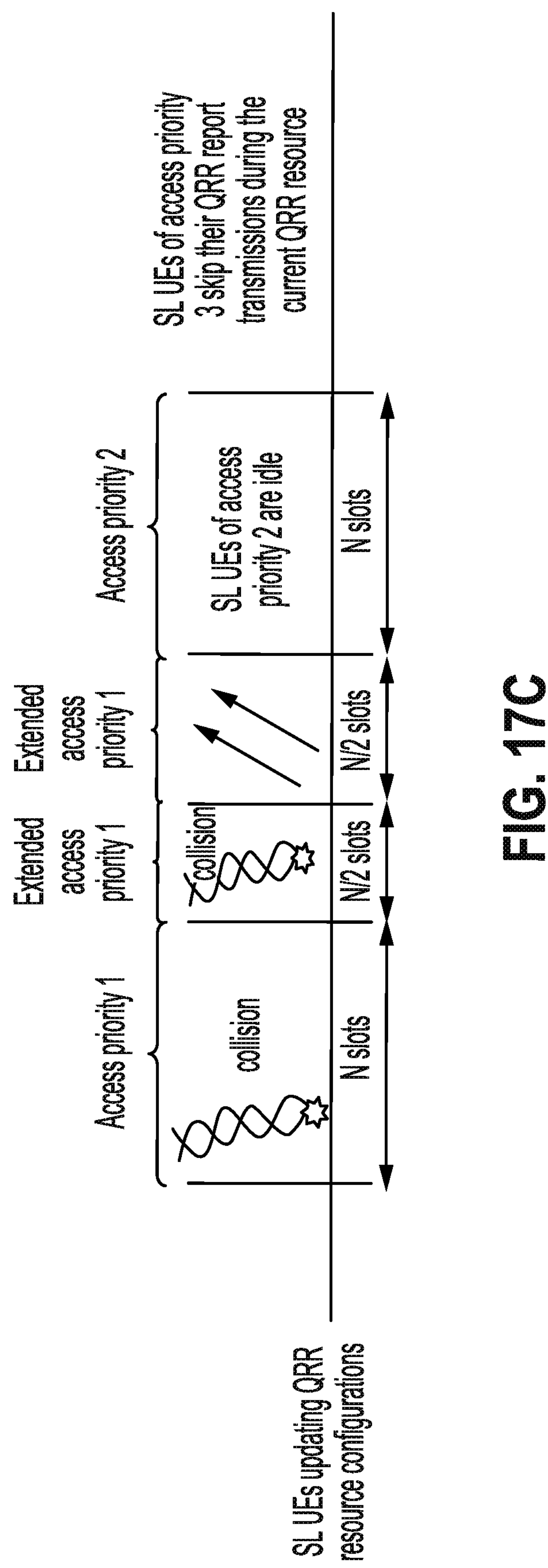

FIGS. 17*a*-17C are diagrams illustrating dynamic SL WTRU QRR channel access.

In one or more cases, three QRR access priorities may be pre-configured. In one or more cases, each of the QRR access priorities may be associated with a QRR certain contention window. Based on the preconfigured SL performance metrics and thresholds SL WTRUs may determine the QRR access priority they belong to during the current QRR occasion. In one or more cases, the SL WTRUs having the highest QRR access priority 1 may transmit the respective QRR reports on the configured QRR resources for access priority 1 (e.g., the first N slots of the 3N-slot QRR occasion). In one or more cases, during the QRR resources of access priority 1, the SL WTRUs of all access priorities may receive and decode the transmitted QRR reports transmitted from the SL WTRUs in proximity. In such, SL WTRUs having lower access priorities may receive and decode the QRR reports that may be transmitted from the higher access priority SL WTRUs, since they are idle (e.g., not transmitting during the contention window, and accordingly, during the QRR resources of the higher access priority SL WTRUs).

In one or more cases, SL WTRUs having the same access priority may detect if there has been a collision or not for the QRR reports they transmitted. For the cases in which the SL WTRUs having the same access priority may detect if there has been a collision or not for the QRR reports they transmitted, SL WTRUs may perform QRR report transmission with full duplexing capability. In such cases, SL WTRUs may transmit the QRR report while monitoring and receiving the respective QRR resource to detect possible collisions. In one or more cases, the QRR resource set for each access priority SL WTRU set is configured with one or more feedback channel resources (e.g., a single OFDM symbol with one PRB), in cases where the transmitting SL WTRUs of the same QRR access priority may be incapable of full duplexing. In such cases where the transmitting SL WTRUs of the same QRR access priority that may be incapable of full duplexing, such SL WTRUs may transmit their QRR reports and accordingly, monitor for ACK/NACK feedback from the CRQ transmitting SL WTRU (e.g., the SL WTRU originally requesting QRR feedback) on the configured QRR feedback resources. For the cases in which the SL WTRUs receive a NACK and/or do not receive an ACK, all SL WTRUs, which have transmitted the QRR report during the QRR resource of the current access priority, may assume a collision has occurred.

For the cases in which a collision is detected of the highest access priority QRR resources, SL WTRUs may update the QRR resource configuration according to the pre-configured offsets. For example, the SL WTRUs of the first QRR access priority may extend the QRR resources by the configured offset (e.g., N/2 slots). In such cases, the SL WTRUs having the highest access priority 1 may (e.g., be allowed to) retransmit their credible and more inclusive QRR reports. In one or more cases, the SL WTRUs having the second access priority may offset their QRR resource sets by the QRR offset of N/2 slots. In one or more cases, as the overall QRR resources may have a limited size (e.g., 3N slots), the SL WTRUs of the lowest access priority 3 may reduce their QRR resource size by N/2 slots. For the cases in which a successive collision of the extended QRR resources of the SL WTRUs with the highest access priority 1 occurs, the same procedure may be repeated, in which the SL WTRUs having the lowest access priority 3 may further reduce their QRR resources by N/2 slots. In one or more cases, the SL WTRUs having the lowest access priority 3 may additionally skip transmitting their QRR reports during the current QRR occasion.

Figure 18:
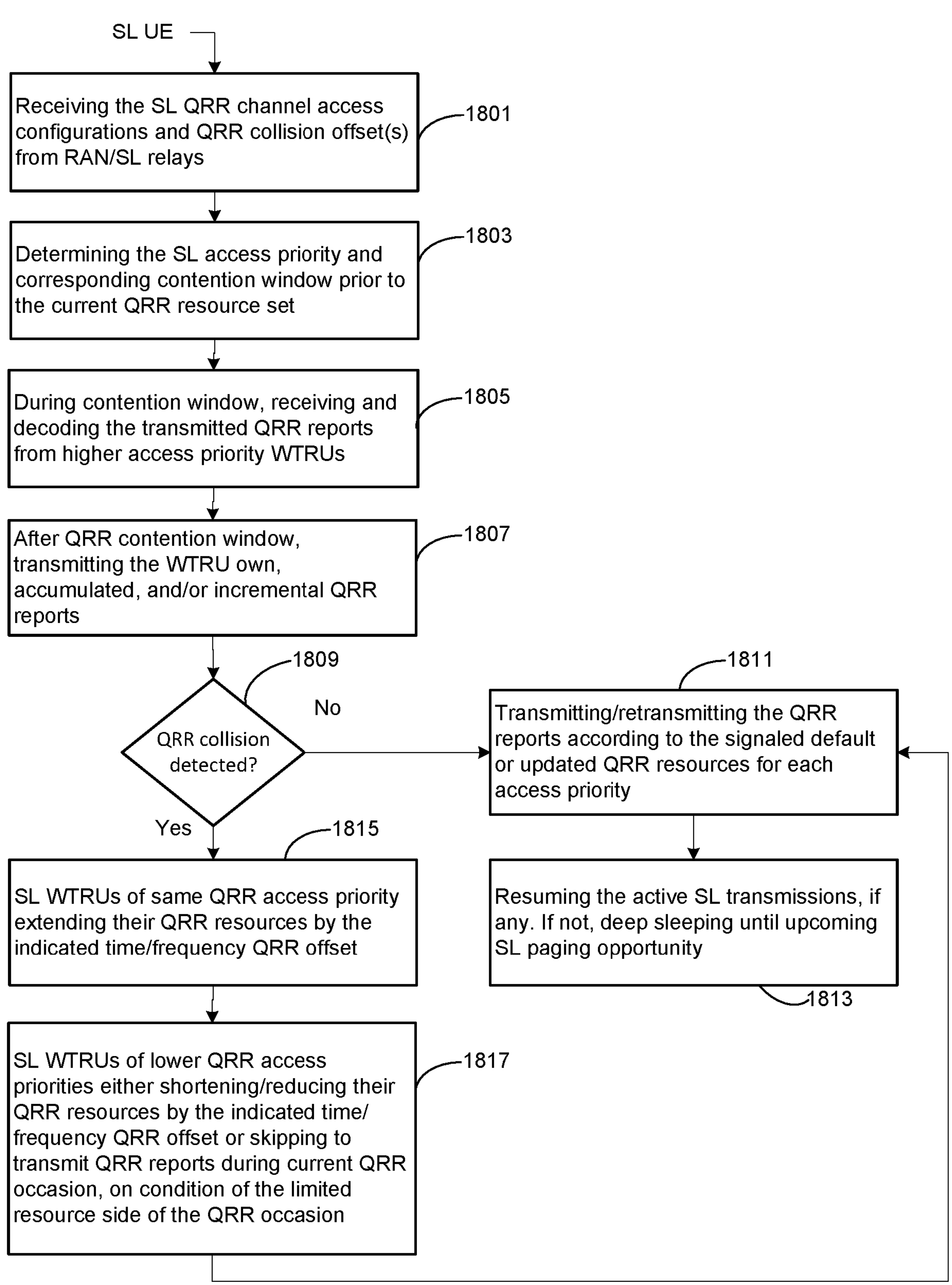
FIG. 18 is a diagram illustrating dynamic SL WTRU QRR channel access.

FIG. 18 is a diagram illustrating dynamic SL WTRU QRR channel access. In one or more cases, a SL WTRU may receive a QRR time and frequency resource offset patterns for QRR collision resolution. In one or more cases, the SL WTRU may monitor and decode the QRR reported transmitted over the QRR resources having the same and/or different QRR access priority resources. In one or more cases, on a condition in which a QRR resource collision is detected, SL WTRUs of the collided QRR access priority may extend their QRR resources by the pre-configured QRR time/frequency offset. In such cases, SL WTRUs having lower QRR access priorities may buffer and/or defer or skip their QRR transmissions during the current QRR occasion.

In one or more cases, a SL WTRU may receive the SL QRR channel access configurations and QRR collision offset(s) from RAN/SL relays (1801). In one or more cases, the SL WTRU may determine the SL access priority and a corresponding contention window prior to the current QRR resource set (1803). In one or more cases, the SL WTRU may, during a contention window, receive and decode the transmitted QRR reports from higher access priority WTRUs (1805). In one or more cases, the SL WTRU may, after a QRR contention window, transmit the WTRU's own, accumulated, and/or incremental QRR reports (1807). In one or more cases, the SL WTRU may determine whether a QRR collision is detected (1809). For the cases in which a QRR collision is not detected (1809:NO), the SL WTRU may transmit and/or retransmit the QRR reports according to the signaled default or updated QRR resources for each access priority (1811). In one or more cases, the SL WTRU may resume the active SL transmissions and/or perform deep sleeping until an upcoming SL paging opportunity (1813). For the cases in which a QRR collision is detected (1809: YES), SL WTRUs having a same QRR access priority may extend their QRR resources by the indicated time and/or frequency QRR offset (1815). In one or more cases, the SL WTRUs having lower QRR access priorities may shorten and/or reduce their QRR resources by the indicated time and/or frequency QRR offset or may skip transmitting QRR reports during current QRR occasion, for example, on condition of the limited resource side of the QRR occasion (1817).

In one or more cases, a WTRU may be configured with a procedure to determine the QRR channel access priority. In a QRR channel access procedure as described above, consistent SL WTRU behaviors, for example, determining the QRR access priority and the corresponding QRR contention windows may be based on consistent SL WTRU behaviors. For example, when SL WTRUs have various performance criteria to consider in order to determine the QRR access priority, the various performance criteria of the SL WTRUs may cause insufficient QRR reporting, in which less credible and inclusive QRR channel reservation reports may be transmitted with a higher priority than other more credible and more inclusive QRR reports. In one or more cases, a unified and/or standardized WTRU behavior for determining a (e.g., respective) QRR access priority to address the insufficient QRR reporting. In one or more cases, several performance indicators may be considered prior to each QRR resource occasion. In one or more cases, SL WTRUs may use such performance indicators to determine the QRR access priority and contention window of the current QRR occasion. In one or more cases, the SL WTRUs may use such performance indicators to determine the QRR access priority and contention window of the current QRR occasion as one or more of: the average and/or filtered SL connection time before each QRR occasion; the mobility status as any of a low or high mobility condition, for example, based on a predefined condition; and the number of the QRR detection instants during the average and/or filtered DL connection time. In one or more cases to determine a query response transmission, the SL WTRUs may be configured to determine a mobility status based on configured or preconfigured thresholds.

Figure 19:
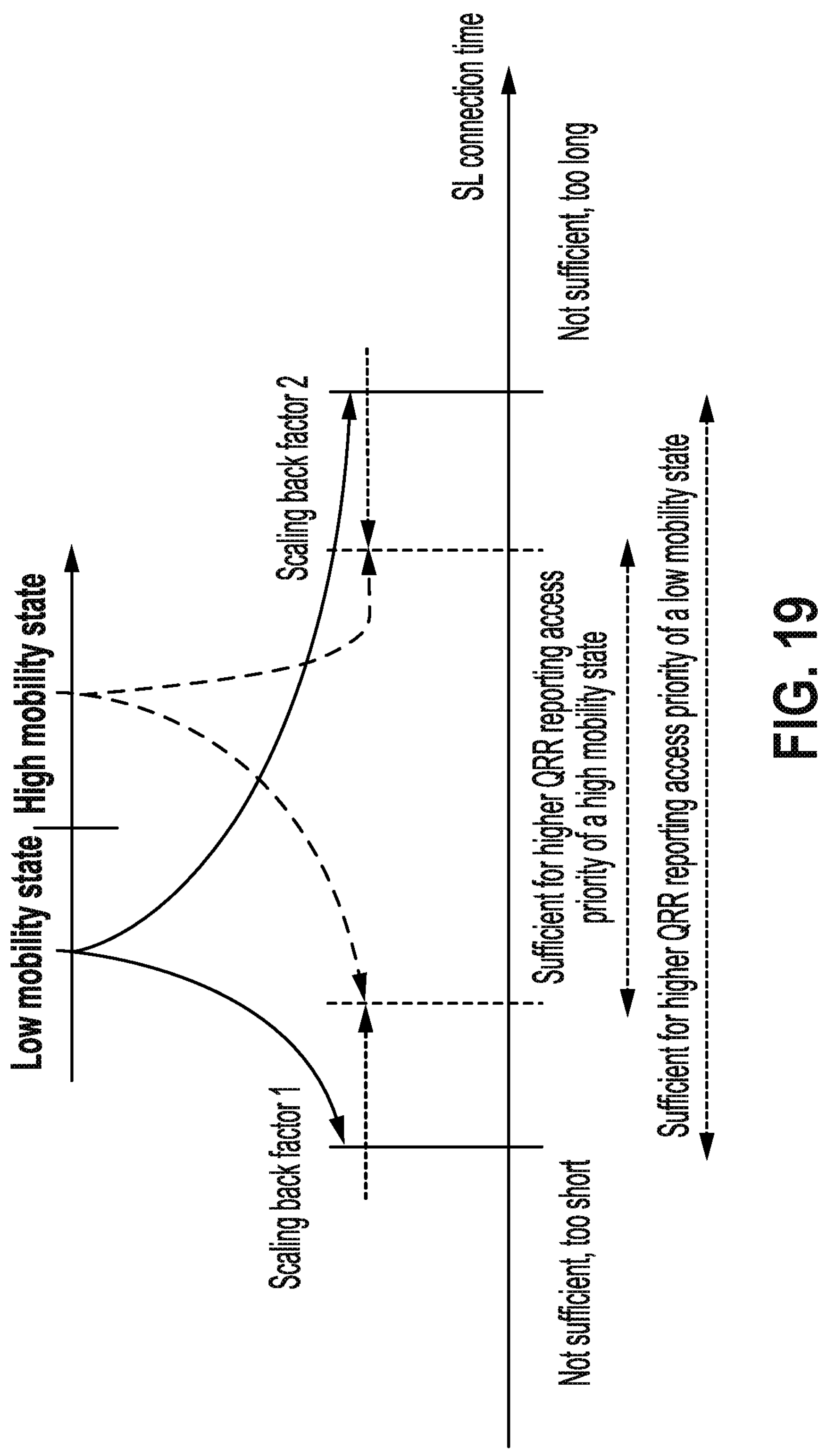
FIG. 19 is a diagram illustrating determining a QRR channel access priority.

FIG. 19 is a diagram illustrating determining a QRR channel access priority.

In one or more cases, two mobility states may be defined as any of a low mobility state and a high mobility state, for example, according to a (e.g., preconfigured) mobility threshold. In one or more cases, SL WTRUs having the low mobility state may adopt a default setup of the other SL performance metrics. In such cases, there may be a SL connection time such that low mobility SL WTRUs may consider a default parameterization of the SL connection time. That is, such SL WTRUs may be configured to have one sufficient state and two short and long insufficient states. In one or more cases for low mobility SL WTRUs, a very short or long SL connection duration prior to the QRR occasion is suboptimal, for example, because such connection may lead to SL WTRUs reporting any of the non-inclusive QRR reports or QRR reports with channel reservation entries of SL WTRUs that are not in proximity anymore (e.g., in cases where those channel reservations are detected from a prior time). In one or more cases for high mobility SL WTRUs, the region and/or boundaries of the sufficient SL connection time may be reduced by preconfigured scaling factors, for example, since the QRR reports of the high-mobility WTRUs has channel reservation entries that have been detected shortly before the QRR occasion. That is, the high mobility SL WTRUs may be misled by the QRR reports, and may improperly (e.g., in error, based on bad data, incorrectly, etc.) perform the QRR procedure with channel reservation entries that are for SL WTRUs which are not in proximity anymore. In such a case, the SL WTRUs having a sufficient SL connection time (e.g., mapped from the SL WTRU-specific mobility state) may adopt a higher QRR access priority.

FIG. 20 is a diagram illustrating a procedure to determine QRR access priority and corresponding WTRU sequence actions. In one or more cases, SL WTRUs may receive a list of SL performance metrics for determining the QRR access priority. In one or more cases, the SL performance metrics may include one or more of: a SL connection time (e.g., duration), a mobility state, and a number of former detected QRR occasions. In one or more cases, the SL WTRUs may receive a mapping list from the signaled performance metrics to at least one of the indicated QRR access priority levels, including scaling offsets. In one or more cases prior to the QRR occasion, SL WTRUs may determine the mobility state, for example, based on the signaled mobility threshold. In one or more cases, SL WTRUs may offset (i.e., backwards or forwards) the performance regions of the indicated performance metrics, for example, based on the determined mobility state and/or corresponding signaled scaling offsets. In one or more cases, SL WTRUs may determine the QRR access priority level of the current QRR occasion, for example, based on the determined region of the signaled performance metrics.

In one or more cases, a SL WTRU may receive a list of SL performance metrics for determining the QRR access priority (2001). In one or more cases, the SL performance metrics may include any of a SL connection time (e.g., duration), mobility state, and a number of former detected QRR occasions. In one or more cases, the SL WTRU may receive a mapping list, for example, for a mapping from the signaled performance metrics to at least one of the indicated QRR access priority levels, including scaling offsets (2003). In one or more cases, the SL WTRU may determine the mobility state, for example, based on the signaled mobility threshold (2005). In one or more cases, a SL WTRU may offset (i.e., backwards or forwards) the performance regions of the indicated performance metrics, for example, based on the determined mobility state and/or corresponding signaled scaling offsets (2007). In one or more cases, the SL WTRU may estimate and determine the QRR access priority level of the current QRR occasion, for example, based on the determined region of the signaled performance metrics (2009). In one or more cases, the SL WTRU may transmit the QRR report over the QRR resources associated with the determined access priority (2011).

In one or more cases, a WTRU may be configured with a dynamic repetition procedure for the active channel allocations. For the cases that maintain high SL transmission reliability as discussed above, there may be a dynamic resource allocation procedure. In one or more cases, there may be at least two classes (e.g., types) of SL WTRUs, which may be a power limited SL WTRUs (e.g., class/type) and a power non-limited SL WTRUs (e.g., class/type). In one or more cases, power-limited SL WTRUs may announce and/or transmit their SL WTRU-specific channel sensing settings to a RAN node and/or to SL WTRU service providers and/or relays. In one or more cases, the sensing settings may include one or more of the WTRU-specific SL DRX cycle, channel sensing periodicity, and length per wake-up time. In one or more cases, the SL relay and/or service providers may compile one or more common resource occasions that minimize the wake-up and/or required sensing of the power-limited SL WTRUs. In such cases, a RAN node and/or SL relay(s) may transmit the common resource set (e.g., resource occasions) of repetitions towards the power non-limited WTRUs. In one or more cases, the power non-limited SL WTRUs may transmit a first stage SCI for channel allocations and may repeat the transmission of a reserved resource report (RRR) over the signaled common repetition occasions. For example, the power non-limited SL WTRUs may transmit a first stage SCI for channel allocations and may repeat the transmission of a reserved resource report (RRR) over the signaled common repetition occasions on condition that reserved resource sets are still active during the common repetition resource occasions. In such cases, the RRR report may include (e.g., entail) information of the remaining channel allocations that are active during the current repetition occasion. In one or more cases, the power limited SL WTRUs may adjust their DRX cycles to decode at least one or more of the indicated common RRR occasions, and over which, power limited SL WTRUs may detect channel reservations from other active power non-limited SL WTRUs. In one or more cases, transmitted common RRR resources may be part of one or more of: the periodic discovery signaling; a first stage SCI on a control channel and/or over SL paging occasions, where an indication of non-scheduling SCI is transmitted to indicate the SCI is to schedule the RRR resources and not a SL PSSCH transmission; and a new repetition sidelink control channel format (rSCI), scrambled with a group common code and which may be only monitored by the power non-limited WTRUs.

Figure 21:
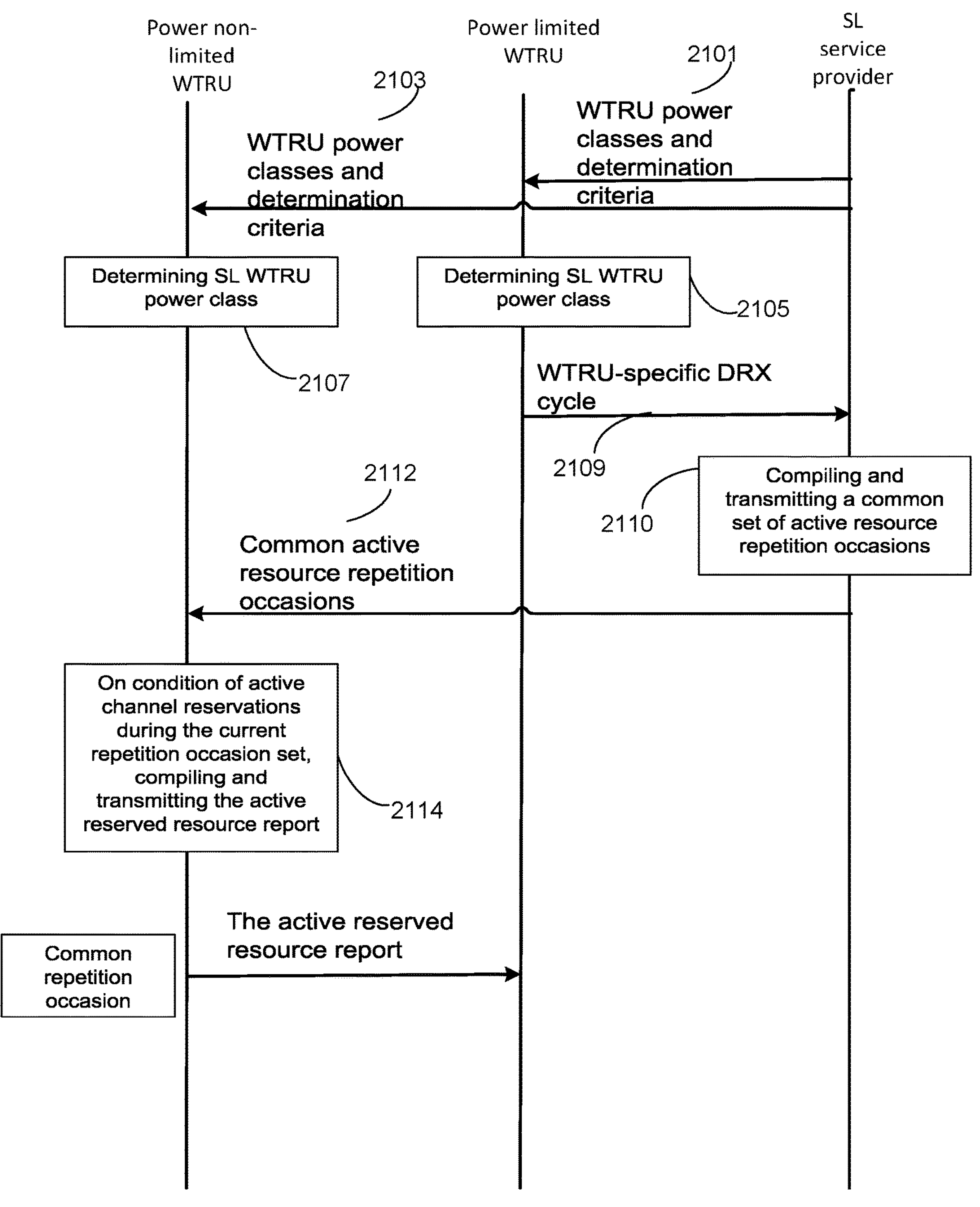
FIG. 21 is a diagram illustrating a dynamic repetition procedure for active channel allocations.

FIG. 21 is a diagram illustrating a dynamic repetition procedure for active channel allocations. In one or more cases, SL WTRUs may determine the power category (e.g., power limited on non-limited category) based on pre-configured power criteria (e.g., battery level, battery capacity threshold). In one or more cases, power limited SL WTRUs may transmit WTRU-specific DRX cycles to any of a SL WTRU cluster head, a SL relay, and a SL service provider. In one or more cases, any of a SL WTRU cluster head, a SL relay, and a SL service provider may compile and transmit a common channel allocation repetition occasion set based on the minimum wake-up time (e.g., and sensing period) of the power limited SL WTRUs. In one or more cases, power limited SL WTRUs may adapt the WTRU-specific DRX cycles to detect at least a single resource set of the indicated repetition occasions. In one or more cases, power non-limited SL WTRUs may formulate a reserved resource report including the remaining active allocated resources during the common repetition occasions. In one or more cases, power non-limited SL WTRUs may duplicate the transmission of the reserved resource report during the common repetition occasion set.

In one or more cases, any of a power non-limited SL WTRU or a power limited SL WTRU may receive, from a network (e.g., a SL service provider) information indicating any of WTRU power classes associated determination criteria (2101, 2103). In one or more cases, any of a power non-limited SL WTRU or a power limited SL WTRU may determine its respective SL WTRU power class (2105, 2107). In one or more cases, a power limited WTRU may transmit, to the SL service provider, information indicating/according to a WTRU-specific DRX cycle (2109). In one or more cases, the SL service provider may determine (e.g., compile) (2110), and transmit to a power non-limited SL WTRU (2112), a common set of active resource repetition occasions. In one or more cases, the power non-limited SL WTRU may, on condition of active channel reservations during the current repetition occasion set, compile, and transmit to the power limited SL WTRU, the active reserved resource report (2114).

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, MME, EPC, AMF, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage. In the process flows of the present disclosure, the operations may be performed in different orders and/or a different number of times. It is noted that certain operations may not be included in a process flow, or other operations may be added to a process flow.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the various embodiments have been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A wireless transmit/receive unit (WTRU) comprising:
a processor and a memory, the processor and memory configured to:
receive a query requesting an indication of sidelink resources utilized by one or more WTRUs;
generate a response indicating one or more sidelink resources utilized by the one or more WTRUs;
determine a priority level of the response; and
transmit the response within a response window of a plurality of response windows comprising a first priority response window and a second priority response window, wherein the first priority response window occurs earlier in time than the second priority response window, and wherein the first priority response window is extended into the second priority response window on condition a collision occurs for a plurality of priority responses associated with the first priority response window.

2. The WTRU of claim 1, wherein the query comprises a channel reservation query.

3. The WTRU of claim 1, wherein the processor and memory are configured to determine the response window for transmitting the response based on the priority level of the response.

4. The WTRU of claim 1, wherein the processor and memory are configured to determine the priority level of the response based on one or more of a length of time the WTRU has been monitoring sidelink resource usage, a number of other responses regarding sidelink resource usage received by the WTRU over a previous period of time, or a WTRU mobility status.

5. The WTRU of claim 1, wherein the processor and memory are configured to determine at least one of time or frequency resources of the response window based on the determined priority level of the response.

6. The WTRU of claim 1, wherein the processor and memory are configured to:
determine the collision occurred;
extend the first priority response window based on the collision; and
transmit a second response in the extended response window, wherein the second response includes the indication of the one or more sidelink resources of the response or additional information and the indication of the one or more sidelink resources of the response.

7. The WTRU of claim 1, wherein resources associated with the response window are usable for a sidelink shared channel transmission on condition that a query requesting an indication of sidelink resources utilized by one or more WTRUs is not received by the WTRU.

8. The WTRU of claim 1, wherein the processor and memory are configured to:
receive a second response to the query prior to transmitting the response to the query, the second response being received from another WTRU; and
update the response based on sidelink resource usage information included in the second response.

9. The WTRU of claim 1, wherein the processor and memory are configured to:
determine that the collision occurred during the first priority response window associated with a first priority level; and
adjust the second priority response window for the response based on determining that the collision occurred during the first priority response window associated with the first priority level.

10. A method implemented in a Wireless Transmit/Receive Unit (WTRU), the method comprising:
receiving a query requesting an indication of sidelink resources utilized by one or more WTRUs;
generating a response indicating one or more sidelink resources utilized by the one or more WTRUs;
determining a priority level of the response; and
transmitting the response within a response window of a plurality of response windows comprising a first priority response window and a second priority response window, wherein the first priority response window occurs earlier in time than the second priority response window, and wherein the first priority response window is extended into the second priority response window on condition a collision occurs for a plurality of priority responses associated with the first priority response window.

11. The method of claim 10, further comprising determining the priority level of the response based on one or more of a length of time the WTRU has been monitoring sidelink resource usage, a number of other responses received by the WTRU over a previous period of time, or a WTRU mobility status.

12. The method of claim 10, further comprising determining at least one of time or frequency resources of the response window based on the determined priority level of the response.

13. The method of claim 10, further comprising:
determining the collision occurred;
extending the first priority response window based on the collision; and
transmitting a second response in the extended response window, wherein the second response includes the indication of the one or more sidelink resources of the response or additional information and the indication of the one or more sidelink resources of the response.

14. The method of claim 10, wherein the response window corresponds to a number of slots.

15. The method of claim 10, wherein the query comprises a channel reservation query.

16. The method of claim 10, further comprising determining the response window for transmitting the response based on the priority level of the response.

17. The WTRU of claim 1, wherein the response window corresponds to a number of slots.

* * * * *